United States Patent
Takenaka et al.

[11] Patent Number: 5,872,893
[45] Date of Patent: Feb. 16, 1999

[54] GAIT GENERATION SYSTEM OF LEGGED MOBILE ROBOT

[75] Inventors: Toru Takenaka; Takashi Matsumoto, both of Saitama, Japan

[73] Assignee: Honda Giken Kogyo Kabushiki Kaisha, Tokyo, Japan

[21] Appl. No.: 899,130

[22] Filed: Jul. 23, 1997

[30]     Foreign Application Priority Data

Jul. 25, 1996 [JP] Japan .................................. 8-214260

[51] Int. Cl.⁶ .................................................. G06F 19/00
[52] U.S. Cl. ........................ 395/80; 318/568.12; 180/8.6; 901/1; 395/95
[58] Field of Search ................................. 395/80, 89, 95, 395/97; 364/167.07, 167.08; 901/1, 50; 318/568.12, 568.1, 568.22; 701/23; 180/8.1, 8.6

[56]           References Cited

U.S. PATENT DOCUMENTS

| | | | |
|---|---|---|---|
| 4,834,200 | 5/1989 | Kajita ........................................ | 180/8.1 |
| 5,337,235 | 8/1994 | Takahashi et al. ...................... | 364/424 |
| 5,357,433 | 10/1994 | Takenaka et al. ...................... | 364/424 |
| 5,428,563 | 6/1995 | Takenaka ................................. | 364/851 |
| 5,432,417 | 7/1995 | Takenaka et al. ................. | 318/568.12 |
| 5,459,659 | 10/1995 | Takenaka ............................. | 364/151 X |

*Primary Examiner*—Joseph Ruggiero
*Attorney, Agent, or Firm*—Lyon & Lyon LLP

[57]              ABSTRACT

A system for generating or determining a desired height of a biped mobile robot having a body and two articulated legs each connected to the body through a hip joint and each including a knee joint, an ankle joint and a foot. In the system, body trajectory of body displacement including desired horizontal body position and orientation, except for a desired body height in the direction of gravity and leg trajectory of foot displacement including a desired position and orientation are predetermined on an off-line computer. Based on the parameters, a body height in the direction of gravity is determined by solving an equation comprised of a continuous function of the body height. Then, desired angles of said hip joints, said knee joint and said ankle joint are determined, through an inverse kinematic solution, based on said determined body trajectory, said leg trajectory and said determined desired body height. With the arrangement, it becomes possible to determine a smooth body height trajectory appropriately reduced in vertical motion on a real time basis during robot locomotion.

36 Claims, 22 Drawing Sheets

FIG. 2

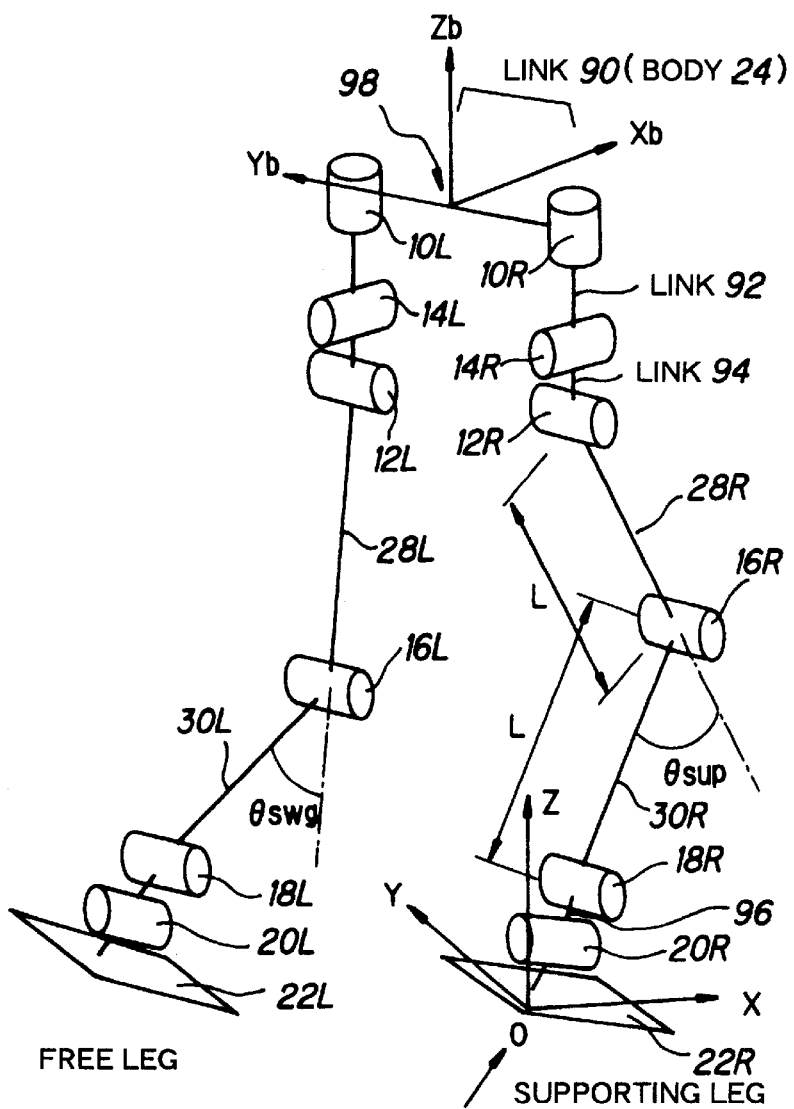

FREE LEG

SUPPORTING LEG

REFERENCE COORDINATE SYSTEM OF SUPPORTING LEG
ORIGIN: FLOOR POINT OBTAINED BY VERTICALLY PROJECTING SUPPORTING LEG
ANKLE WHEN SUPPORTING LEG IS ENTIRELY IN CONTACT WITH FLOOR
DIRECTION OF X-AXIS: DIRECTION HORIZONTALLY PROJECTED FROM SUPPORTING
LEG TOE
DIRECTION OF Z-AXIS: DIRECTION OF GRAVITY
DIRECTION OF Y-AXIS: DIRECTION PERPENDICULAR TO X-AXIS (FREE LEG SIDE IS
DETERMINED TO BE POSITIVE)

EQUATION OF SENSITIVITY $$S = \frac{L*L}{\dfrac{\cos(\theta\text{sup})*\Delta Z\text{sup}}{(1-\cos(\theta\text{sup})*\cos(\theta\text{sup}))*\sin(\theta\text{sup})} + \dfrac{\cos(\theta\text{swg})*\Delta Z\text{swg}}{(1-\cos(\theta\text{swg})*\cos(\theta\text{swg}))*\sin(\theta\text{swg})}}$$

GAIT GENERATION SYSTEM OF LEGGED MOBILE ROBOT

BACKGROUND OF THE INVENTION

1. Field of the Invention

The present invention relates to a system for and a method of generating a gait of a legged mobile robot, and more particularly to a system for and a method of generating or determining a height, in the direction of gravity (the vertical direction), of a body of a legged mobile robot such as a biped robot.

2. Description of the Related Art

Generally, a legged mobile robot comprises of a body (trunk) and articulated legs (leg linkages) each connected to the body by a joint. In a conventional gait generation in a legged mobile robot, the desired body height (in the direction of gravity) has been expressed by a polynomial of time as follows and the body trajectory has been generated or determined based on the solution of the polynomial.

$$\begin{aligned} Z &= f(\text{time}) \\ &= a_n \cdot t^n + a_{n-1} \cdot t^{n-1} + \ldots a_1 \cdot t^1 + a_0 \end{aligned}$$

where Z is the desired body height and t is time.

In another conventional technique, the desired body height has been expressed by a polynomial of desired horizontal body displacement and the body height trajectory has been generated or determined based on the solution. Specifically, $$\begin{aligned} Z &= f(X) \\ &= a_n \cdot X^n + a_{n-1} \cdot X^{n-1} + \ldots a_1 \cdot X^1 + a_0 \end{aligned}$$

where Z is the desired body height and X is the desired fore/aft body displacement.

In the conventional first and second methods mentioned above, the desired distal end (foot) positions/orientations of the legs and the desired body orientation are also expressed using similar polynomials. The desired horizontal body position is determined so as to satisfy the condition of robot dynamics, more specifically to place the ZMP (Zero Moment Point; explained later) within a prescribed range. Then, based on the thus determined desired body height, desired horizontal body position, desired body orientation and desired distal end positions/orientations of the legs, all joint angles are determined through an inverse kinematic solution.

However, since the determination or generation of desired body height determined in either of the conventional first and second methods does not take into account the influence which would be caused by the desired horizontal body position, desired body orientation and the desired distal end positions/orientations of the legs, a robot posture determined by the joint angles which are in turn determined from the above mentioned positions/orientations can not always satisfy the determined desired body height. For example, if the joint angles are determined such that the resulting distance between the leg distal end and the body exceeds, even for an instant, the total leg length, the desired body height will not be achieved even when the joints are controlled to stretch the leg to the full extent.

In order to avoid this, the conventional second method determines the function of the desired body height by repeating a trial and error procedure of computer simulation. However, locomotion or walking of a legged mobile robot includes a number of variations. For example, the gait may be different in environments such as on a horizontal plane, an incline, stairs, a curved path, etc. The gait may also differ with velocity and/or acceleration in the kinds of locomotion such as at the time of starting, walking at a low or high speed, and stopping. It is therefore quite difficult to determine the desired body height in advance through trial and error on computer simulation, even when the environment and the nature of locomotion are simplified or restricted to a limited range. Moreover, since the conventional methods can not always ensure that the robot posture defined by the joint angles determined will satisfy the determined body height over the entire course of locomotion, as mentioned earlier, the conventional methods fail to generate or determine a desired gait, more specifically the desired body height on a real-time basis during the locomotion.

In a third conventional method, it has been proposed to determine a desired horizontal body position, a desired body orientation and desired distal end positions/orientations of the legs beforehand, and the desired body height is determined within a maximum limit determined by the height at which at least one of the leg(s) is drawn to the full length, in other words, by the highest position that the robot can possibly take. This third method can always ensure a robot posture that satisfies the desired body height unless the horizontal distance between the leg distal end and the root of the body at which the leg is connected, is within the leg length.

However, this conventional third method is disadvantageous in that the vertical acceleration of body (vertical body motion in the direction of gravity) becomes discontinuous at the instant when both legs are stretched. In particular, if the robot is a biped robot, the body height trajectory is not smooth at the instant when both legs are stretched, resulting in a sharp vertical acceleration (displacement acceleration in a motion in the direction of gravity).

BRIEF SUMMARY OF THE INVENTION

An object of the present invention is therefore to solve the drawbacks in the prior art techniques and to provide a system for and a method of generating or determining the gait of a legged mobile robot, more particularly a system for and a method of generating or determining a desired height of a body of a legged mobile robot in the direction of gravity, which always ensures that the resulting posture determined by joint angles will satisfy the desired body height over the entire course of locomotion.

Another object of the present invention is to provide a system for and method of generating or determining a gait of a legged mobile robot, which determines a desired body height in the direction of gravity in such a manner that the amplitude of the vertical body motion is decreased and is smooth.

Still another object of the present invention is to provide a system for and method of generating or determining a gait of a legged mobile robot, which determines a desired body height in the direction of gravity on a real-time basis during locomotion.

Yet still another object of the present invention is to provide a system for and method of generating or determining a gait of a legged mobile robot, which determines a desired body height in the direction of gravity such that the robot joint angles are controlled to effect the determined body height.

In order to achieve the object, there is provided a system for generating a gait of a legged mobile robot having at least a body and a plurality of articulated legs each connected to the body through a first joint and each including a second joint, comprising body trajectory determining means for determining a trajectory of body displacement including at least one of desired horizontal body position and orientation, but excluding a desired body height; leg trajectory determining means for determining a trajectory of each leg distal end displacement including at least one of desired position and orientation; desired body height determining means for determining a body height by solving an equation comprised of a continuous function of the body height based on the determined body trajectory and leg trajectory to determine the desired body height based on the solution; and joint angle determining means for determining desired angles of said first and second joints based on said determined body trajectory, said leg trajectory and said determined desired body height.

According to another aspect of the invention, there is provided a method for generating a gait of a legged mobile robot having at least a body and a plurality of articulated legs each connected to the body through a first joint and each including a second joint, comprising the steps of determining a trajectory of body displacement including at least one of desired horizontal body position and orientation, but excluding a desired body height; determining a trajectory of each leg distal end displacement including at least one of desired position and orientation; determining a body height in the direction of gravity by solving an equation comprised of a continuous function of the body height based on the determined body trajectory and leg trajectory to determine the desired body height based on the solution; and determining desired angles of said first and second joints based on said determined body trajectory, said leg trajectory and said determined desired body height.

BRIEF DESCRIPTION OF THE DRAWINGS

These and other objects and advantages of the invention will be more apparent from the following description and drawings, in which:

FIG. 2 is an explanatory view explaining the coordinate system, etc., to be used in the gait generation or determination of the system taking the biped mobile robot illustrated in FIG. 1 as example;

DETAILED DESCRIPTION OF THE PREFERRED EMBODIMENTS

Embodiments of the invention will now be explained taking a biped mobile robot as the example of the legged mobile robot.

Figure 1:
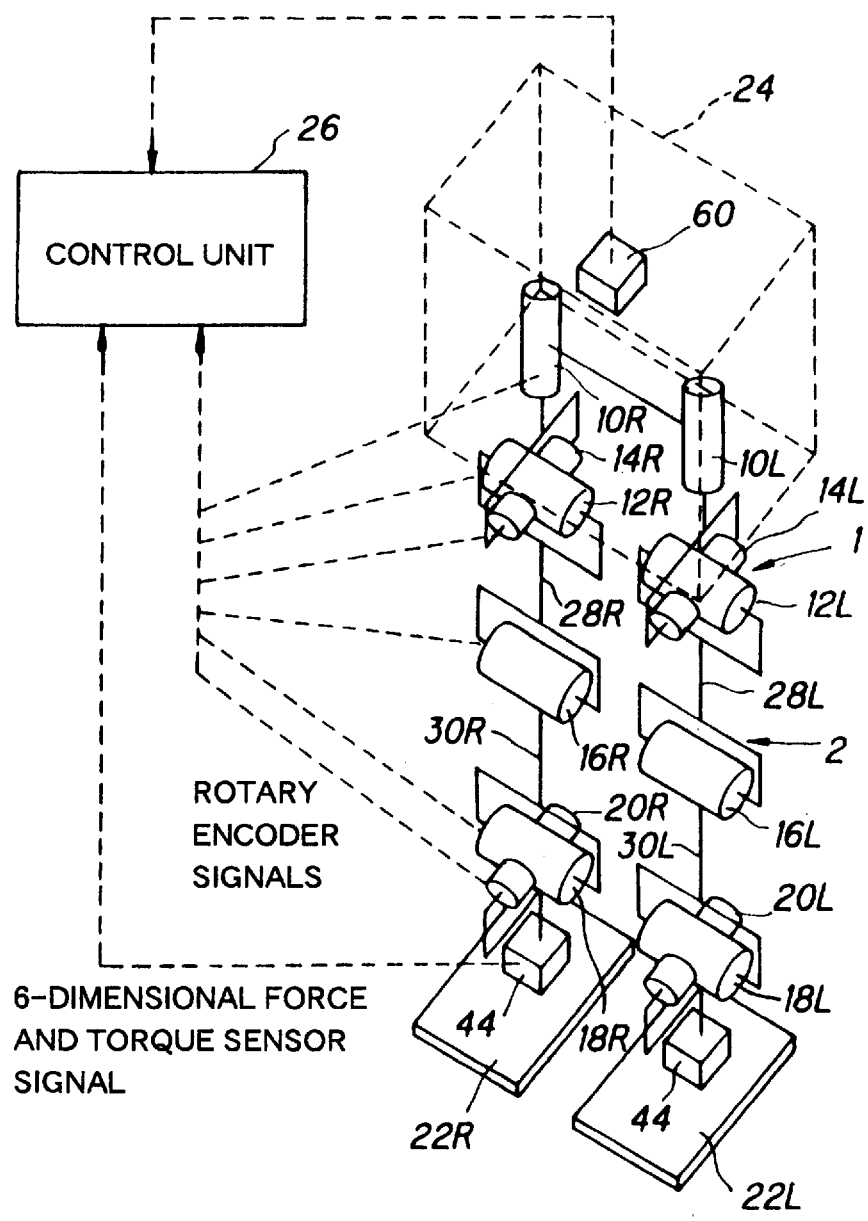
FIG. 1 is a schematic view showing an overall configuration of a gait generation or determination system of a legged mobile robot according to the present invention.

FIG. 1 is an overall schematic view showing the system for and method of generating or determining a gait of a legged mobile robot according to the invention. FIG. 2 shows a skeleton diagram of the biped mobile robot or two-legged walking robot 1 illustrated in FIG. 1, particularly illustrating a coordinate system used in the gait generation explained later.

As illustrated in the figures, the robot 1 has a pair of laterally spaced articulated legs (leg links) 2 each composed of six joints. For an easier understanding, each of the joints is represented by an electric motor which actuates the joint. The joints include, arranged successively downward, a pair of joints 10R, 10L (the right-hand joint is indicated by R and the left-hand joint by L) for turning legs with respect to a hip, a pair of joints 12R, 12L for pitching movement with respect to the hip about a Y-axis within a sagittal plane, a pair of joints 14R, 14L for rolling movement with respect to the hip about an X-axis within a frontal plane, a pair of knee joints 16R, 16L for pitching movement with respect to knees, a pair of joints 18R, 18L for pitching movement with respect to feet 22R(L), and a pair of joints 20R(L) for rolling movement with respect to the foot 22R, 22L.

The robot 1 has a body (trunk) 24 in its uppermost portion which houses therein a control unit 26 comprising microcomputers which will be described later with reference to FIG. 3. The joints 10R(L), 12R(L), 14R(L) make up hip joints, and the joints 18R(L), 20R(L) make up ankle joints. The hip joints and knee joints are connected to each other by thigh links 28R, 28L, and the knee joints and ankle joints are connected to each other by crus or shank links 30R, 30L. With the above structure, each of the legs 2 is given six degrees of freedom. When the 6×2=12 joints are driven to suitable angles while the robot 1 is walking, a desired motion is imparted to the entire leg structure to cause the two-legged walking robot 1 to walk arbitrarily in a three-dimensional environment including stairs.

As disclosed in FIG. 2, the origin of the coordinate system is set at the supporting leg. The lengths of links 92, 94, 96 are assumed to be zero. These links are omitted in FIG. 1. The body height is a height at a predetermined portion or position of the body 24 in the direction of gravity (Z-axis), i.e., a representative position such as an midpoint 98 between the left and right sides of the body 24.

A known six-dimensional force and torque sensor 44 is disposed below the ankle joint 18, 20R(L) for measuring three directional components Fx, Fy, Fz of force and three directional components Mx, My, Mz of torque or moment thereby to detect whether the foot 22R(L) has landed or not, or if a load or force is acting on the robot through the foot assembly when it contacts the floor. The body 24 has an inclination sensor 60 for detecting a tilt or inclination in the frontal plane with respect to a Z-axis (the direction of gravity) and its angular velocity, and also a tilt in the sagittal plane with respect to the Z-axis and its angular velocity. The electric motors of the respective joints are coupled with respective rotary encoders for detecting angular displacements of the electric motors.

Figure 3:
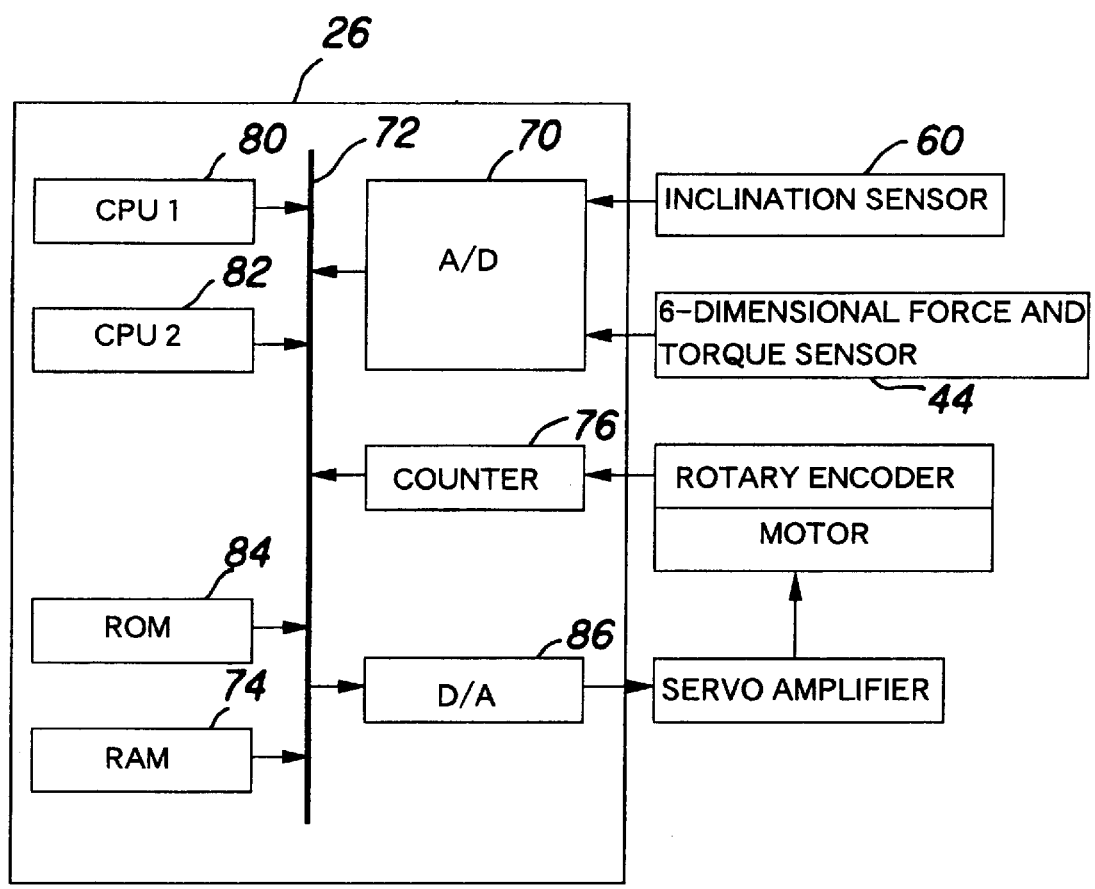
FIG. 3 is a block diagram showing details of the hardware configuration of a control unit illustrated in FIG. 1.

FIG. 3 shows in block diagram details of the control unit 26, which comprises microcomputers. Output signals from the sensors 44 and the inclination sensor 60 are converted by an A/D converter 70 into digital signals, which are transmitted through a bus 72 to a RAM 74. Output signals from the rotary encoders that are disposed adjacent to the respective electric motors are supplied through a counter 76 to the RAM 74.

The control unit 26 includes first and second CPUs 80, 82. The first CPU 80 reads gait parameters which are generated and stored in a ROM 84 beforehand, calculates or determines the desired body height in a manner explained later and desired joint angles based on the stored parameters and the determined desired body height, and outputs the calculated values to the RAM 74. The second CPU 82 reads desired joint angles and detected measured values from the RAM 74 as described later on, calculates manipulated variables (control inputs) necessary to drive the joints, and outputs the calculated manipulated variables through a D/A converter 86 and servo-amplifiers to the electric motors which actuate the respective joints.

Figure 4:
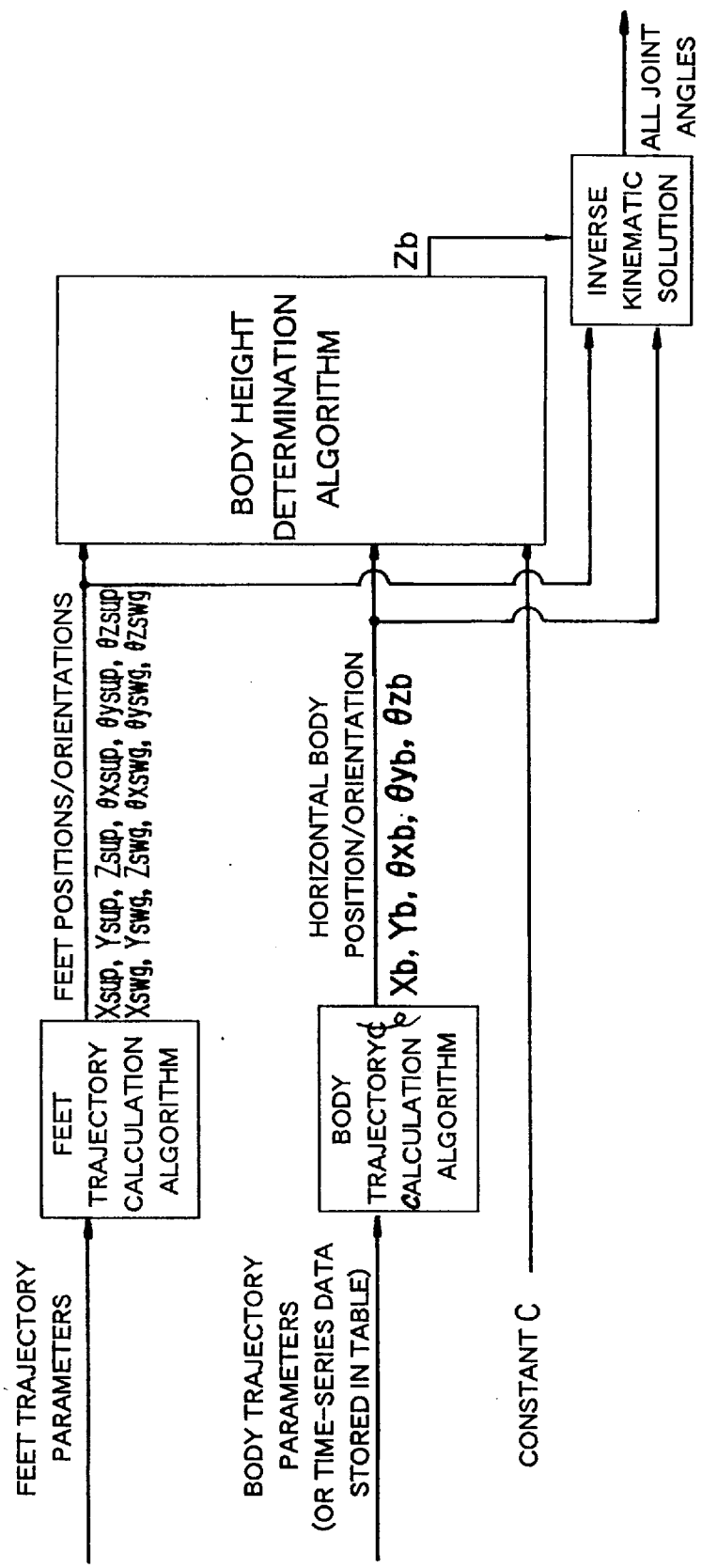
FIG. 4 is a block diagram showing the configuration, in a software manner, of the gait generation or determination system according to the invention which is achieved by the control unit illustrated in FIG. 3.
Figure 5:
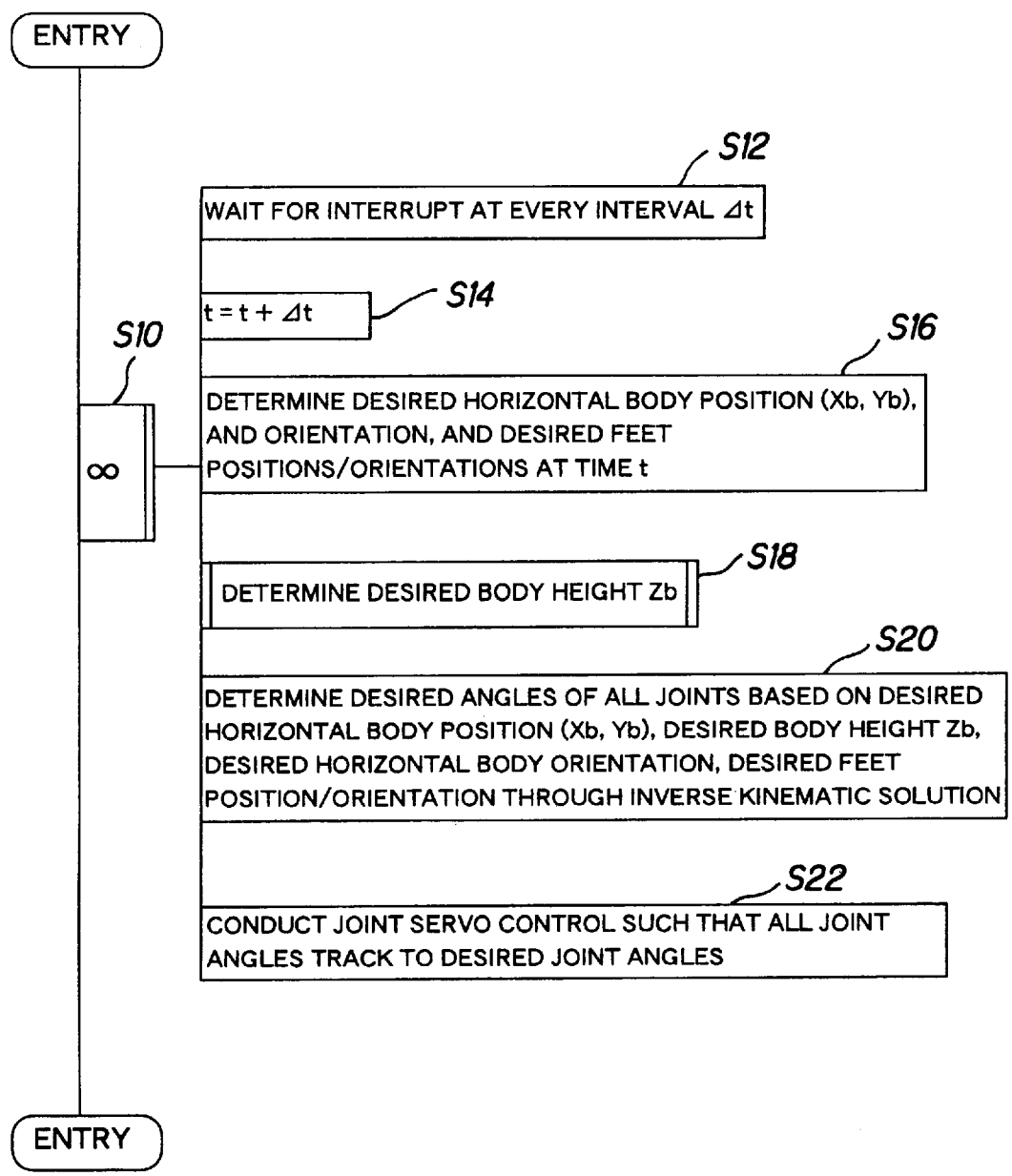
FIG. 5 is a main routine flow chart showing the operation of the gait generation or determination system according to the invention.
Figure 6:
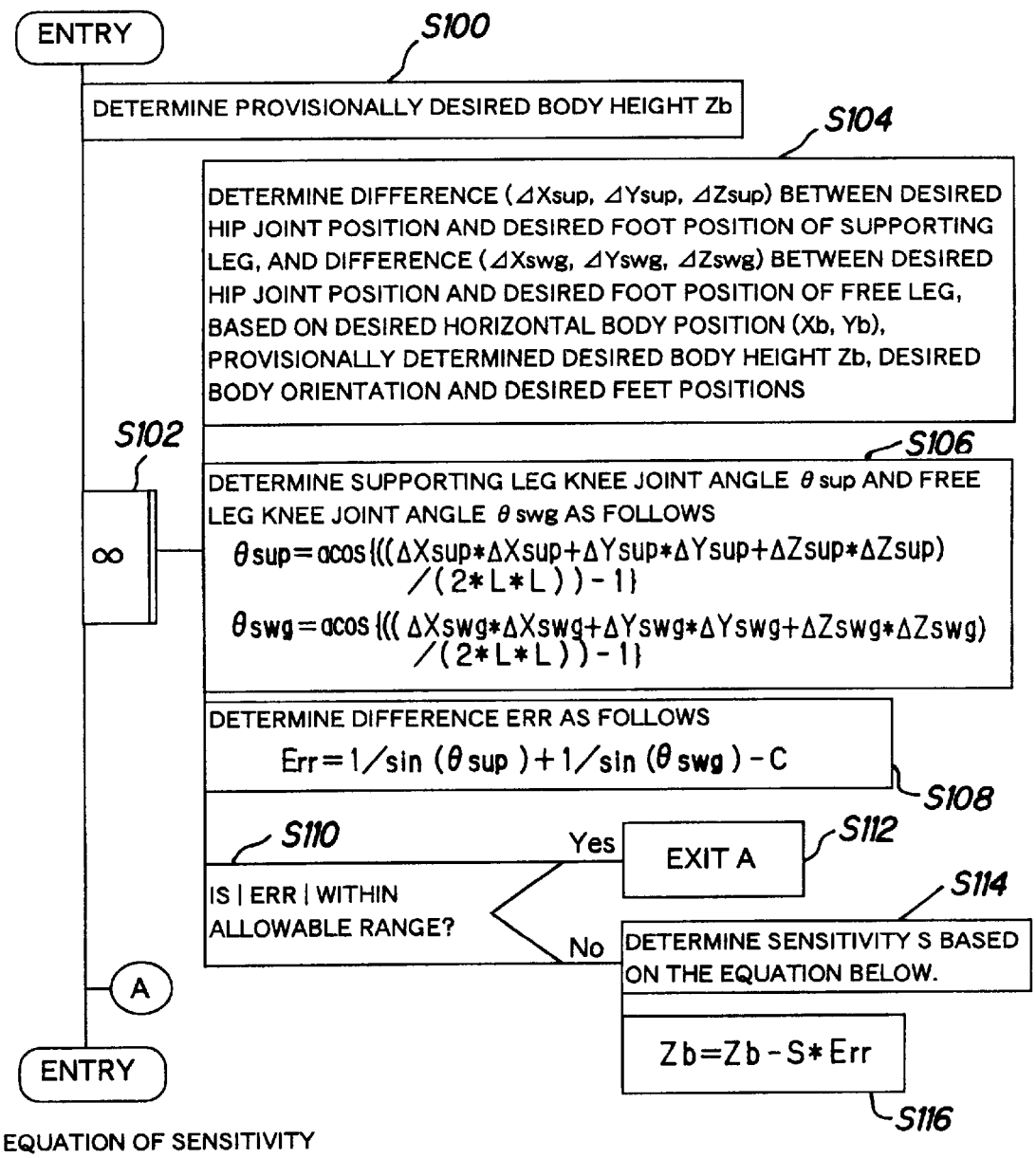
FIG. 6 is a flow chart showing the subroutine of the determination of a body height referred to in the flow chart of FIG. 5.

FIG. 4 is a block diagram which shows the configuration of the system according to the invention in a software manner, and FIGS. 5 and 6 are flow charts for explaining the mode of operation of the system.

Figure 7:
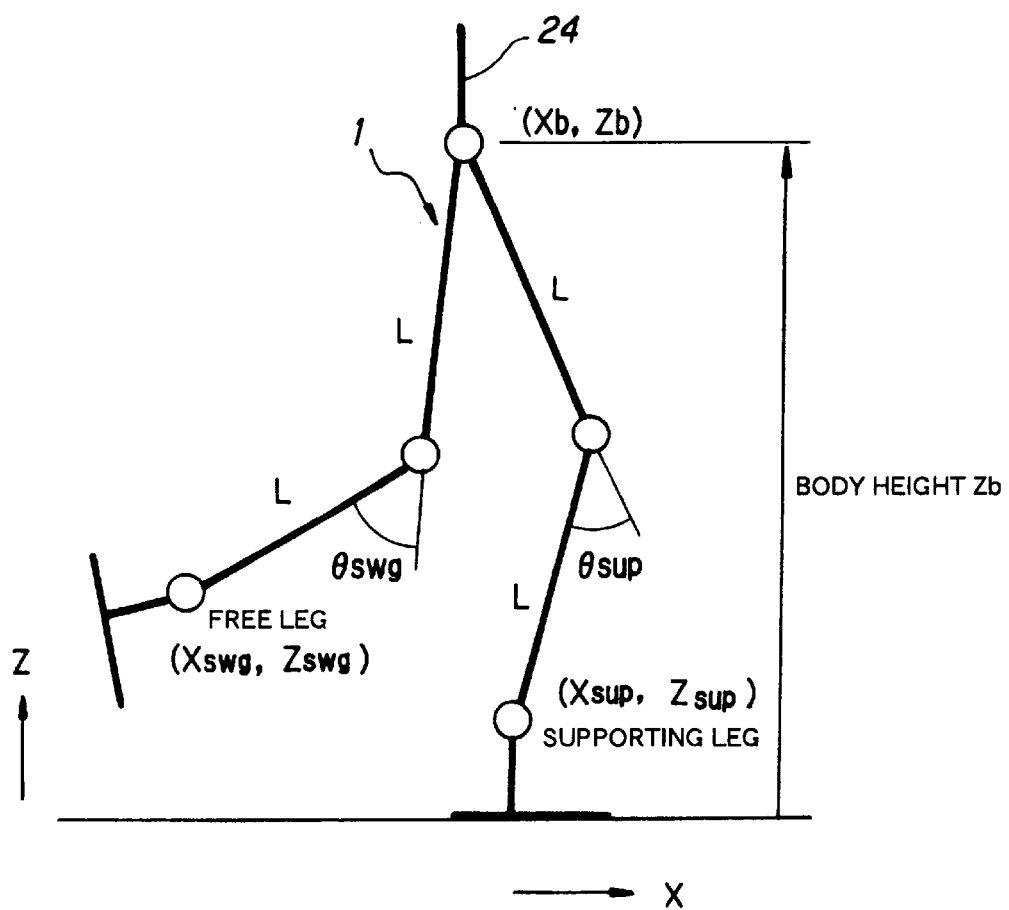
FIG. 7 is a view explaining variables used in the body height determination in the flow chart of FIG. 6.

Prior to explaining the figures, however, the basic concept of the invention will be described with reference to FIG. 7. To be easily understood, the robot 1 is illustrated in a two-dimensional space.

In the biped robot 1 illustrated, the knee joint angle of the supporting leg is defined as $\theta sup$, while that of the free (swinging) leg is defined as $\theta swg$. It is assumed that the knee joint 16R(L) can be bent only in the backward as for a human knee joint, in other words, $\theta sup$, $\theta swg$ are defined by positive values. As an example of a smooth continuous function describing $\theta sup$, $\theta swg$, the following equation is established.

$$f(\theta sup, \theta swg) = 1/\sin(\theta sup) + 1/\sin(\theta swg) \qquad \text{Eq. 1}$$

Geometrically, $\theta sup$ is a function describing the body position (Xb, Zb) and the foot position defined by the ankle joint (Xsup, Zsup) of the supporting leg, and $\theta swg$ is a function defining the body position (Xb, Zb) and the foot position defined by the ankle joint (Xswg, Zswg) of the free (swinging) leg as follows.

$$\theta sup = H(Xb, Zb, Xsup, Zsup) \qquad \text{Eq. 2a}$$

$$\theta swg = H(Xb, Zb, Xswg, Zswg) \qquad \text{Eq. 2b}$$

Here, H (Xb, Zb, X, Z) is obtained by a geometric calculation and is defined by the following equation.

$$H(Xb, Zb, X, Z) = a\cos\left[\{(Xb-X)\cdot(Xb-X)+(Zb-Z)\cdot(Zb-Z)\}/(2\cdot L\cdot L) - 1\right] \qquad \text{Eq. 3}$$

Since the domain of definition of acos is [−1, 1], H (Xb, Zb, X, Z) should be a set of (Xb, Zb, X, Z) which satisfies the following equation.

$$(Xb-X)\cdot(Xb-X)+(Zb-Z)\cdot(Zb-Z) \leq 4\cdot L\cdot L \qquad \text{Eq. 4}$$

Eq. 4 requires that the distance between the hip joint (10, 12, 14R(L)) and the feet 22R(L), more precisely the ankle joint (18, 20R(L)) is equal to or less than the total leg length 2 L.

Eq. 2 yields Eq. 5.

$$f(\theta sup, \theta swg) = f\{(H(Xb, Zb, Xsup, Zsup), H(Xb, Zb, Xswg, Zswg)\} \qquad \text{Eq. 5}$$

This means that the function of knee joint angles of both legs $f(\theta sup, \theta swg)$ can be replaced with a function describing the body (position) coordinate and the foot (ankle joint) positions of both legs g (Xb, Zb, Xsup, Zsup, Xb, Zb, Xswg, Zswg), in other words has the same function value, where the definition of g (Xb, Zb, Xsup, Zsup, Xb, Zb, Xswg, Zswg) is $f\{(H(Xb, Zb, Xsup, Zsup), H(Xb, Zb, Xswg, Zswg)\}$. The domain of definition of the function g is a set of (Xb, Zb, Xsup, Zsup, Xb, Zb, Xswg, Zswg) which satisfies the following equation.

$$(Xb-Xsup)\cdot(Xb-Xsup)+(Zb-Zsup)\cdot(Zb-Zsup) \leq 4\cdot L\cdot L \qquad \text{Eq. 6a}$$

$$(Xb-Xswg)\cdot(Xb-Xswg)+(Zb-Zswg)\cdot(Zb-Zswg) \leq 4\cdot L\cdot L \qquad \text{Eq. 6b}$$

In the above, g is a smooth continuous function.

In the above function g (Xb, Zb, Xsup, Zsup, Xb, Zb, Xswg, Zswg), assuming that the variables Xb, Xsup, Zsup, Xswg, Zswg are known and only the variable Zb indicative of body height is unknown, the function g will have the following characteristics.

Characteristic 1

If the set of (Xb, Zb, Xsup, Zsup, Xb, Zb, Xswg, Zswg) is within the domain of definition of function g given by Eq. 6 with respect to a certain body height, in other words, if both the distances from the hip joints to the two ankle joints are less than the total foot length 2L, the function g (Xb, Zb, Xsup, Zsup, Xb, Zb, Xswg, Zswg) increases monotonically or gradually with increasing body height Zb, and becomes infinity when either of the knee joints has been drawn to the full extent. This characteristic will be obtained if the function g is solved and the relationship between g and Zb is obtained. More simply, however, the feature will be understood from the characteristic of the function $f$ which has the same nature as that of g. More specifically, as the body height Zb is increased in FIG. 7, knee joint angles θsup, θswg of both legs tends towards zero. The denominators in the right term in Eq. 1 tends toward zero and as a result, $f$ (θsup, θswg) increases monotonically or gradually. Finally, when either of θsup, θswg becomes infinitesimal, in other words, when either of the knee joints is fully stretched, the corresponding term in the right hand side of Eq. 1 becomes infinity, and the value of $f$ (θsup, θswg) becomes infinity.

Characteristic 2

Based on the fact that g (Xb, Zb, Xsup, Zsup, Xb, Zb, Xswg, Zswg) and $f$ (θsup, θswg) have these characteristics mentioned above, the second characteristic of the function g will be explained.

When a certain value C is defined with respect to a value C0 as in Eq. 7, ordinary robot walking will have a robot height which always satisfies Eq. 8a and Eq. 8b expressed using the value C.

$$C > C0 \quad \text{Eq. 7}$$

$$f(\theta sup, \theta swg) = C \quad \text{Eq. 8a}$$

$$g(Xb, Zb, Xsup, Zsup, Xb, Zb, Xswg, Zswg) = C \quad \text{Eq. 8b}$$

To explain this, in an ordinary robot walking, if the body height Zb is determined appropriately, the distances from the hip joint to the ankles are sufficiently less than the foot length 2L. This means that, when the body height Zb is appropriately set and when it is assumed that θsup, θSwg, obtained from Eqs. 2, 2b and 3, should be less than a value δ as expressed in Eq. 9, the value δ always exists.

$$\theta sup > \delta \text{ and } \theta swg > \delta \quad \text{Eq. 9}$$

Since g and $f$ have the same value, an appropriate determination of body height Zb will satisfy the following equation (Eq. 10).

$$g(Xb, Zb, Xsup, Zsup, Xb, Zb, Xswg, Zswg) < 1/\sin(\delta) + 1/\sin(\delta) \quad \text{Eq. 10}$$

In the above, when the body height is raised monotonically or gradually, g increases monotonically or gradually up to infinity. This means that, with reference to a given value C which satisfies the following equation, the body height Zb which satisfies Eq. 8b exists.

$$1/\sin(\delta) + 1/\sin(\delta) < C < \infty \quad \text{Eq. 11}$$

By replacing 1/sin (δ)+1/sin (δ) as C0, characteristic 2 can be obtained.

Characteristic 3

Characteristic 3 can be obtained from characteristic 1.

To be more specific, the body height Zb which satisfies Eq. 8a and 8b decreases (becomes lower) with decreasing C, while increasing (becomes higher) with increasing C. If C is increased up to infinity, the body height Zb will be the same as that obtained in the aforesaid conventional second method. On the other hand, to increase C will make the knee joint angle smaller, but will make vertical body acceleration (or deceleration), or more specifically the amplitude of vertical body acceleration (or deceleration) greater.

Characteristic 4

Since the function $f$ is a symmetric expression with respect to left and right leg knee joint angles as is shown in Eq. 1, if the distal end (foot) of one leg is raised or lifted, its knee is bent and the other leg is stretched. More specifically, since the work necessary for lifting of one leg distal end is distributed to both legs, the amount of leg expansion and contraction, i.e., the amount of knee joint bending becomes less, rendering joint angular velocity (in absolute values) during walking smaller.

Based on the above, the configuration as well as the operation of the system will be explained.

As illustrated in FIG. 4, the gait generation or determination system according to the invention has a feet trajectory calculation algorithm and a body trajectory calculation algorithm. Using an off-line computer, parameters (characteristic amount) of walking including a step length (stride), walking period (pitch), etc., are determined and, based on the determined parameters and feet trajectory parameters (indicative of how the foot is displaced) are prepared beforehand. The foot trajectory parameters have been stored in the ROM 84 of the control unit 26. Similarly, a trajectory indicative of desired ZMP has been determined in advance in the off-line computer and body trajectory parameters have been predetermined so as to satisfy the desired ZMP. The body trajectory parameters have been stored in the ROM 84. (The body trajectory parameters may instead be time-series table values).

Here, the term ZMP (Zero Moment Point) means a floor point at which the line of action of resultant force (made up of the gravitational force and inertial force generated by locomotion) intersects; when the resultant force is expressed as force and moment about a point of action, the point at which the moments Mx, My (excluding Mz) are zero.

The stored parameters are successively read out and are input to the feet trajectory calculation algorithm and the body trajectory calculation algorithm which calculate or determine the desired leg distal end positions/orientations, specifically the desired positions/orientations of the feet, more specifically desired position of the feet 22R(L) defined with respect to the ankle joints 18, 20R(L) and desired orientation of the feet 22R(L), and the desired horizontal body position/ orientation.

Explaining this with reference to the flow chart of FIG. 5, the program starts at S10 and proceeds to S12 in which an interrupt at every interval Δt (control cycle, e.g., 10 milliseconds) is waited for. When the time interrupt occurs, the program proceeds to S14 in which time t is updated by Δt, and then proceeds to S16 in which desired horizontal body position (Xb, Yb), the desired body orientation (θxb, θyb, θzb), desired positions (Xsup, Ysup, Zsup, Xswg, Yswg, Zswg) and orientations (θxsup, θysup, θzsup, θxswg, θyswg, θzswg) of the feet are calculated or determined. These are instantaneous values.

The program then proceeds to S18 in which the desired body height Zb is calculated or determined.

FIG. 6 is a flow chart showing the subroutine of the calculation of the desired body height.

In the algorithm shown in FIG. 6, the before-mentioned basic concept of the invention is extended to that in a three-dimensional space. Describing the correspondence with the before-mentioned basic concept in a two-dimensional space, the following equation is established as the continuous function describing the joint angles.

$$f(\theta sup, \theta swg) = 1/\sin(\theta sup) + 1/\sin(\theta swg) \qquad \text{Eq. 12.}$$

In order to determine the body height, the following equation (corresponding to Eq. 8a) is established. C is set to be a constant.

$$f(\theta sup, \theta swg) = C \qquad \text{Eq. 13.}$$

The embodiment is configured to determine a body height which satisfies Eqs. 12 and 13 as the desired body height. Since it is impossible to determine the body height immediately, the calculation is made using the Newton method or some similar methods.

Explaining FIG. 6, the program starts at S100 in which the body height Zb is provisionally determined. This will be an initial value for determining the desired body height Zb using the Newton-Euler method.

The program proceeds, via S102, to S104 in which the desired hip joint positions of the supporting leg and the free leg are determined, through geometric calculation, based on the aforesaid desired horizontal body position (Xb, Yb), the body height Zb, and the desired body orientation ($\theta xb$, $\theta yb$, $\theta Zb$). Then a difference ($\Delta Xsup$, $\Delta Ysup$, $\Delta Zsup$) between the desired hip joint position and the desired foot position of the supporting leg, and a difference ($\Delta Xswg$, $\Delta Yswg$, $\Delta Zswg$) between the desired hip joint position and the desired foot position of the free leg are calculated based on the desired hip joint positions of the supporting and free leg and the desired foot positions (Xsup, Ysup, Zsup, Xswg, Yswg, Zswg) and orientations ($\theta xsup$, $\theta ysup$, $\theta zsup$, $\theta xswg$, $\theta yswg$, $\theta zswg$) of the legs.

Then, the program proceeds to S106 in which the supporting leg knee joint angle $\theta sup$ and the free leg knee joint angle $\theta swg$ are calculated or determined, based on the theorem of trigonometric function, in accordance with the equation shown there. The program next proceeds to S108 in which a difference ERR of the left and right terms in Eq. 13 is calculated. Specifically, the difference ERR is calculated by subtracting the constant C from the right term in Eq. 12. The program then proceeds to S110 in which it is determined whether the absolute value of the difference ERR is within an allowable range, in other words, whether it is sufficiently small, and if it is, the program proceeds to S112 in which the provisionally determined body height is determined as the desired body height Zb and the program proceeds back the main routine of FIG. 5.

On the other hand, when the result in S110 is negative, the program proceeds to S114 in which a sensitivity S is determined in accordance with the equation of sensitivity illustrated at the bottom of FIG. 6. The equation of sensitivity is obtained by partial-differentiating an equation describing the difference ERR by Zb. The program then proceeds to S116 in which the provisionally determined body height Zb is added to the product of minus S and ERR, in other words, the product of S and ERR is subtracted from Zb. The provisionally determined value Zb is thus corrected and is replaced with the corrected value. The program then proceeds back to S104 and the procedures are repeated until the desired body height is determined.

It should be noted that the corrected value Zb may sometimes exceeds the domain of definition when the function loses linearity by a great extent. In such a case, it is preferable to decrease the correction amount ($-S \times ERR$).

Returning to FIG. 5, the program proceeds to S20 in which desired joint angles of all the joints such as the joints 10R(L), 12R(L),.. are determined or calculated through the known inverse kinematic solution based on the thus determined desired horizontal body position (Xb, Yb), the desired body height Zb, the desired body orientation ($\theta xb$, $\theta yb$, $\theta zb$), the desired feet positions (Xsup, Ysup, Zsup, Xswg, Yswg, Zswg) and orientations ($\theta xsup$, $\theta ysup$, $\theta zsup$, $\theta xswg$, $\theta yswg$, $\theta zswg$) of both legs. The calculated desired joint angles are stored in the RAM 74.

The program then proceeds to S22 in which all the joints are controlled to be displaced to the desired angles in the CPU 2. Since, however, the robotic joint servo is known, no further explanation is made. Moreover, the desired feet positions/ orientations, etc., are modified in a compliance control (not explained) and the desired joint angles are determined using the modified values. Since, however, the modification is not the gist of the invention, no explanation is made.

Having been configured in the manner described above, the system according to the embodiment makes it possible to appropriately generate a gait, more specifically to determine the desired body height in the direction of gravity in such a manner that a robot posture defined by the joint angles always satisfies the body height.

Moreover, the system makes it possible to generate a gait, more specifically to determine the desired body height such that the motion of the body in the direction of gravity and the motion of all joints are made smooth so that the amplitudes in vertical body displacement, velocity and acceleration (or deceleration) are effectively decreased. Furthermore, the system makes it possible to generate a gait, more specifically to determine the body height on a real-time basis during robot locomotion, enabling a control of the robot locomotion based on the joint angles determined. It has therefore become possible to change the gait of locomotion in response to a change in environment.

Furthermore, the expression is symmetric with respect to the knee joint angles such that lifting one leg distal end causes the knee ankle of the leg to bend, while the other leg to stretch. With the arrangement, the work of leg lifting can be distributed to the two legs, thereby decreasing the amount of knee ankle bending and as a result, decreasing the angular velocity of the joints. In addition, since the solution of the continuous equation varies monotonically and becomes infinity when the body is at the highest point, the solution can be obtained without fail. This is also helpful in determining the appropriate determination of the body height. However, the solution need not be increased up to infinity. It suffices if the solution is sufficiently large.

Figure 8:
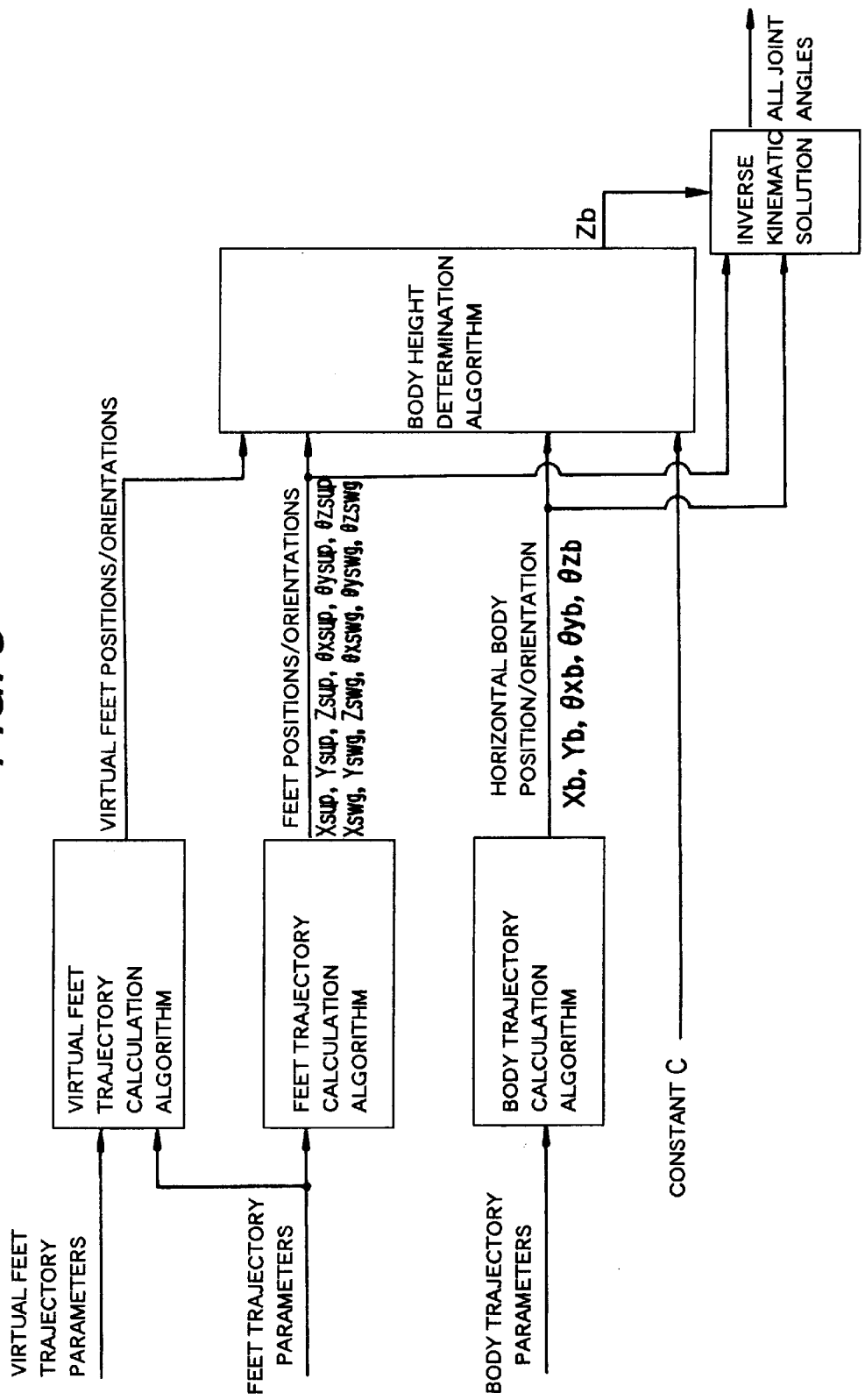
FIG. 8 is a block diagram, similar to FIG. 4, but showing the configuration of the gait generation or determination system according to a second embodiment of the invention.

FIG. 8 is a block diagram showing the configuration of the gait generation system according to a second embodiment of the invention.

Figure 10:
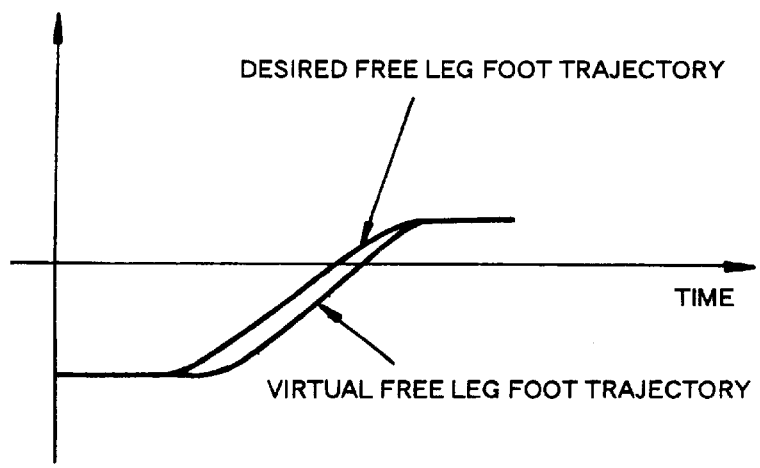
FIG. 10 is a time chart showing a virtual free leg trajectory referred to in the flow chart of FIG. 9.

In the second embodiment, as illustrated in FIG. 8, a virtual feet trajectory calculation algorithm is added to the configuration of the first embodiment which generates or determines a virtual trajectory of positions/ orientations of the feet and forwards them to the body height determination algorithm. More specifically, as illustrated in FIG. 10, the trajectory of the desired free leg foot position intentionally deviated from the inherent desired position is prepared as the virtual free leg trajectory parameters and the virtual feet trajectory calculation algorithm determines the virtual feet positions and orientations, more specifically the virtual position and orientation of the foot of the free leg defined with respect to the ankle joint.

Figure 9:
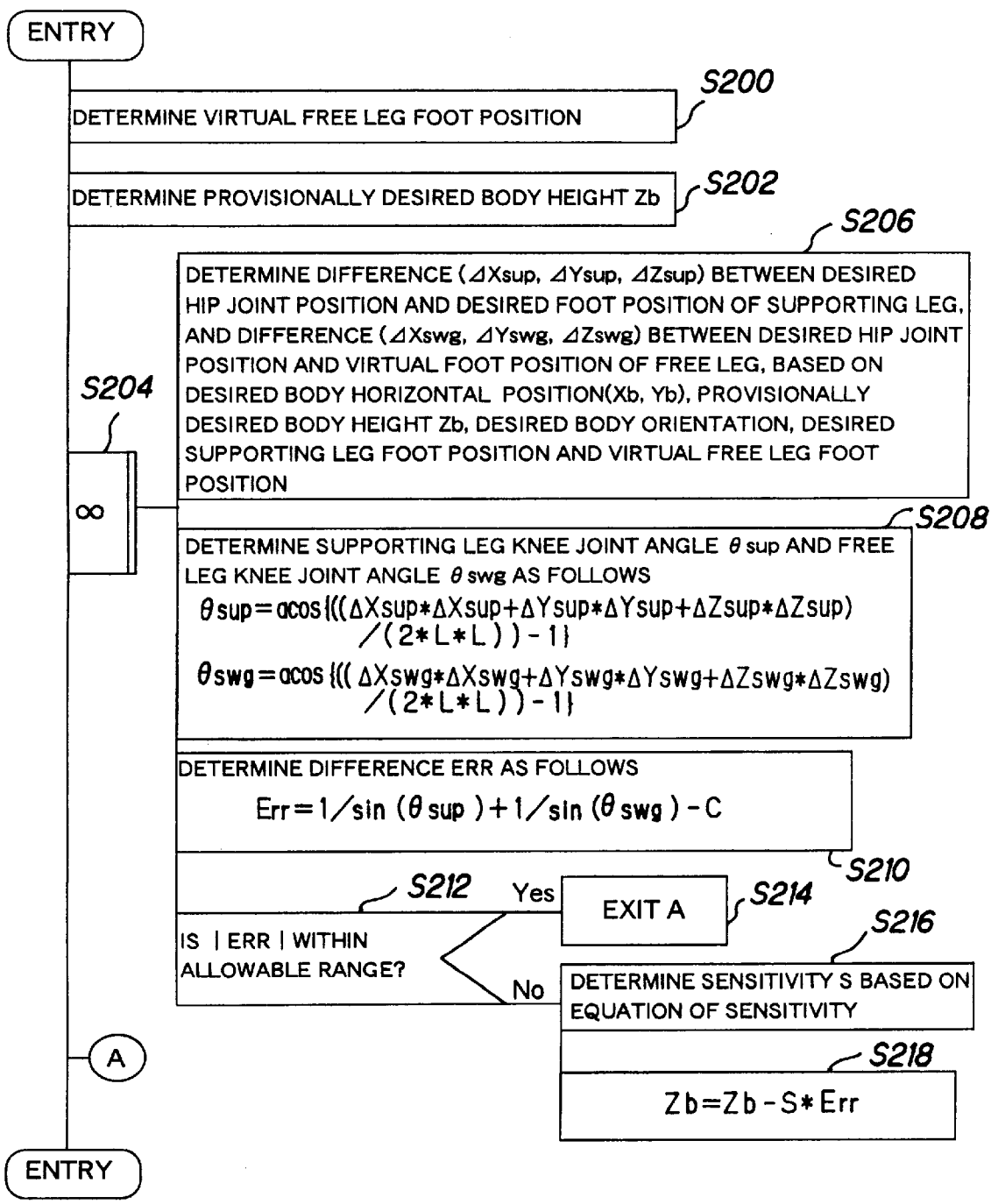
FIG. 9 is a flow chart, similar to FIG. 6, but showing the operation of the system according to the second embodiment.

FIG. 9 is a flow chart showing the subroutine of the determination of the body height according to the second embodiment. The main routine of the second embodiment is the same as that illustrated in FIG. 5 in the first embodiment.

Explaining the operation of the gait generation system according to the second embodiment with reference to FIG. 9, the program starts at S200 in which the virtual free leg foot position is determined, as just mentioned, based on the virtual foot trajectory parameters prepared in the off-line computer and stored in the memory. The program then proceeds to S202 in which the body height Zb is provisionally determined and, via S204, to S206 in which the differences (ΔXsup, ΔYsup, ΔZsup) and (ΔXswg, ΔYswg, ΔZswg) are determined in a manner similar to that in the first embodiment. Here, (ΔXswg, ΔYswg, ΔZswg) is a difference between the desired hip joint position and the virtual foot position of the free leg.

Then the program proceeds to S208 to S214 (or to S218) in a similar manner to those in the first embodiment. Thus, the second embodiment only differs from the first embodiment in that some are virtual values.

With the arrangement, the system according to the second embodiment makes it possible to appropriately generate a gait, more specifically to determine the desired body height in the direction of gravity such that the robot posture satisfies the desired body height. Moreover, the system determines the body height in such a manner that the motion of the body in the direction of gravity and the motion of all joints are made smooth so that amplitudes of vertical body displacement, velocity and acceleration are effectively decreased. Furthermore, the system can generate a gait, more specifically to determine the body height on a real-time basis during robot locomotion, enabling to control the robot locomotion based on the joint angles determined, while changing the gait of locomotion according to a change in environment.

Figure 11:
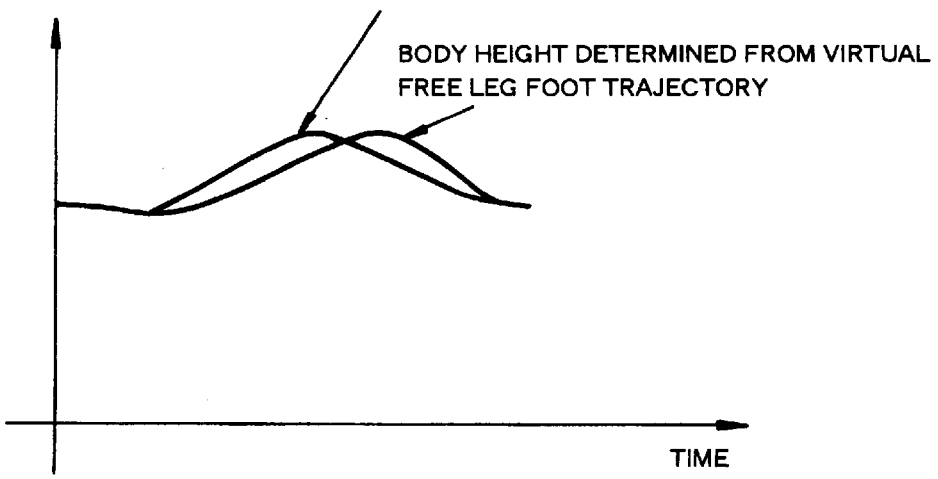
FIG. 11 is a time chart showing the body height determined from the virtual free leg trajectory illustrated in FIG. 10.

When comparing the second embodiment with the first embodiment, the second embodiment is disadvantageous in that the possibility of ensuring the robot posture which satisfies the desired body height is somewhat degraded. However, the second embodiment has an advantage over the first embodiment, since it can vary the body height as desired as illustrated in FIG. 11. More specifically, when the vertical body motion is intended to be slightly delayed, this can be done by determining the trajectory in such a manner that the virtual free leg distal end (foot) position lags behind the inherent position. This makes it possible to, for example, shift the time at which the supporting leg foot 22R(L) contacts the floor, so as to avoid a weakened contact caused by an excessive downward body acceleration, etc., thus preventing the robot from spinning.

It should be noted in the second embodiment, although the virtual trajectory is determined for the free leg, it is alternatively possible to determine it for the supporting leg or both the free leg and the supporting leg.

Figure 12:
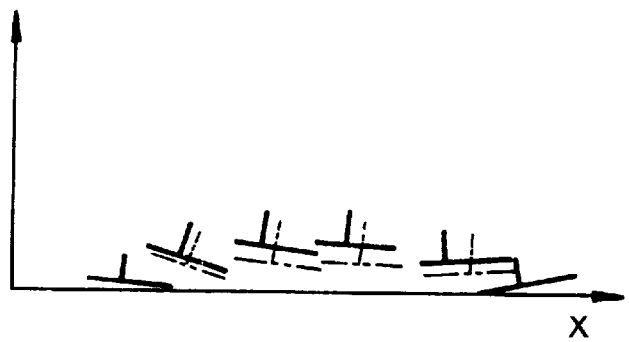
FIG. 12 is a view showing a trajectory of foot in the operation of the gait generation or determination system according to a third embodiment of the invention.
Figure 13:
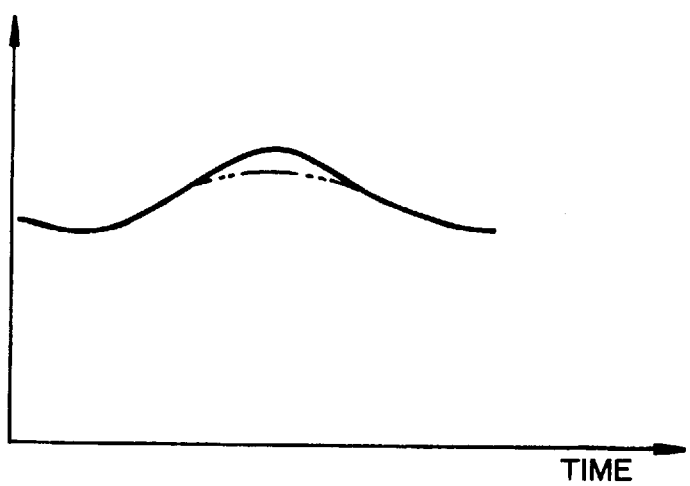
FIG. 13 is a time chart showing the desired body height generated or determined by the system according to the third embodiment.

FIG. 12 is a view showing a trajectory of foot of the gait generation or determination system according to the a third embodiment of the invention and FIG. 13 is time chart showing the desired body height generated in the third embodiment of the invention.

The third embodiment is an alteration of the second embodiment and in the third embodiment, the virtual free leg trajectory is determined to be lower (in the direction of gravity) than the inherent trajectory. In FIG. 12, the solid lines represent the inherent foot trajectory predetermined from the characteristic amount such as the walking step (stride) and walking period (pitch), while phantom lines represent virtual trajectory. In the third embodiment, the virtual trajectory which is lower than the original trajectory is prepared. Although not shown, the parameters of the virtual trajectory are input to an algorithm which is similar to the virtual feet trajectory calculation algorithm shown in FIG. 8.

FIG. 13 illustrates the body height generated or determined in the third embodiment. The solid lines represents a trajectory determined based on the inherent foot trajectory parameters, while phantom lines represent those determined based on the virtual foot trajectory parameters. As is apparent from the figure, the body height can be lowered (decreased in the direction of gravity) by lowering the foot trajectory in the same direction.

In the gait generation of a biped robot such as that illustrated in the figures of this application, when the body height is determined to be low, in other words, when the trajectory of center of gravity of the robot is determined to be low in the direction of gravity, the robot walks bending the knee joint 16R(L) greatly, resulting in a great torque required at all times during walking. On the other hand, when the trajectory of center of gravity of the robot is determined to be high, the vertical motion of the center of gravity become great, increasing the amplitude of the vertical component (downward or upward acceleration) of the floor reaction force. This is disadvantageous and degrades the gripping force of the robot foot with the floor as was referred to earlier, and causes the impact (shock) from the floor to increase.

In the third embodiment, however, since the body height can be lowered if desired, in addition to the advantages mentioned in the second embodiment, it becomes possible to generate a gait which decreases the vertical acceleration.

Figure 14:
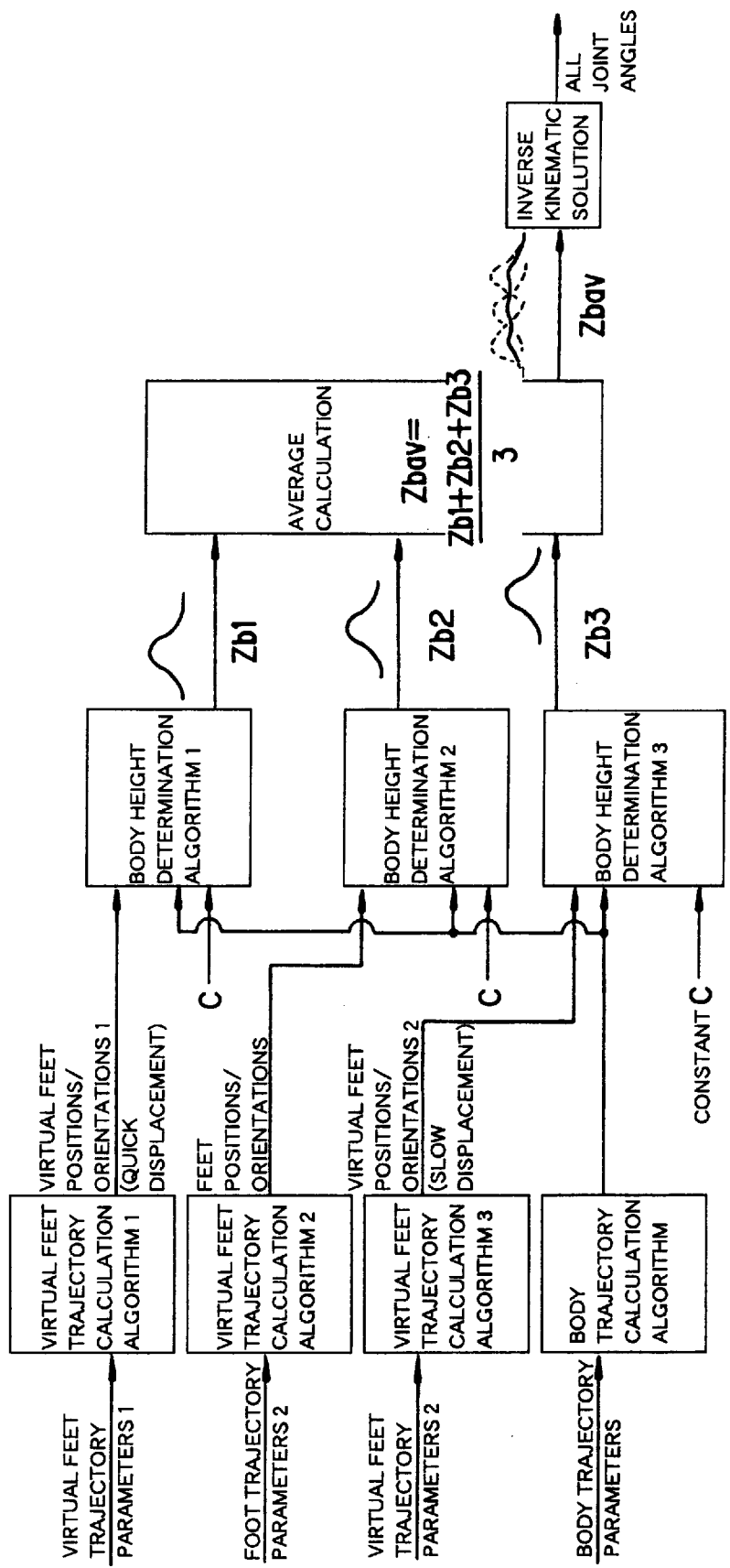
FIG. 14 is a block diagram, similar to FIG. 4, but showing the configuration of the gait generation or determination system according to a fourth embodiment of the invention.

FIG. 14 is a block diagram, similar to FIG. 8, but showing the configuration of the system according to a fourth embodiment of the invention.

The fourth embodiment is another alteration of the second embodiment, in which three kinds of feet trajectory parameters are predetermined and are used to determine the body height. Specifically, in addition to the virtual feet trajectory parameters (virtual parameters 1) and the inherent feet trajectory parameters (parameters 2), virtual feet trajectory parameters (virtual parameters 2) are provided. At the same time, three kinds of virtual feet trajectory calculation algorithms 1, 2, 3 are provided to receive the three kinds of parameters, as illustrated in FIG. 14.

In the fourth embodiment, feet positions/orientations calculated in the virtual feet trajectory calculation algorithm 2 are inherent (standard) values which are the same as those disclosed in the first embodiment. On the other hand, the virtual feet trajectory calculation algorithm 1 calculates the virtual feet positions/ orientations such that the feet are displaced more quickly than the inherent values calculated in the calculation algorithm 2, and the calculation algorithm 3 calculates the feet positions/orientations such that the feet are displaced more slowly than the inherent values calculated in the calculation algorithm 2.

Similarly, three kinds of body height determination algorithms 1 to 3 are prepared. Waveforms indicative of the body heights Zb1, Zb3 calculated in the first and third determination algorithms 1, 3 are different from the waveform indicative of the standard body height Zb2 (calculated in the second algorithm 2) at the time at which the waveforms peak. These three values are input to an averaging calculation in which a simple mean value Zbav is calculated. Like the foregoing embodiments, all the desired joint angles are then calculated based on the parameters including the average Zbav of the body height through an inverse kinematic solution.

In the fourth embodiment, in addition to the advantages mentioned in the foregoing embodiments, since the body heights are averaged, it becomes possible to decrease the amplitude of the body height relative to the inherent body height, thereby enabling to decrease or lower the desired body height. With the arrangement, it becomes possible to decrease the vertical motion to decrease the floor reaction force when controlling the robot locomotion to bend the knee joint to a great extent on stairs or in some similar environment.

The following will explain how to generate or determine virtual foot trajectory (parameters) used in the second to fourth embodiments.

Specifically, the virtual trajectory can be generated;
a) if the free leg distal end (foot) trajectory is generated using the polynomial of time, by varying or deviating the constant in the polynomial from its initial value;
b) if the trajectory is generated by using a filter proposed earlier by the assignee and described in the U.S. Pat. (No. 5,428,563), which is incorporated herein by reference by varying or deviating the time constant in the filter from its initial value;
c) by adding a time function describing the amount of (required) deviation to the desired free leg foot trajectory.

It should be noted that in the second to fourth embodiments, instead of foot trajectory, it is alternatively possible to vary at least one or all of the desired body orientation, desired horizontal body position and leg foot orientation to prepare the virtual value(s).

Following are examples of varying or deviating the desired horizontal body position.

a) if the desired horizontal body trajectory parameters have been prepared as timeseries table data, it suffices if a future datum i.e., a datum, ahead of the current time t, indicative of the desired position at a future time is read out. The same will also be applied to a past value when the position is intended to lag behind. More generally, the virtual horizontal body position Xbv(t) at time t can be expressed as follows.

$$Xbv(t) \sum_{k=n}^{m} WnXb(t + k\Delta t)$$

Where $\Delta t$ is the time interval in the table data, and n, m are integers. Wn is weight, and Xb(t) is the desired horizontal body position at time t.

b) Another method to obtain a virtual desired horizontal body position is to filter a current (inherent) desired horizontal body position. When the transfer function of the filter is determined, for example, as $(TnS+1)/(TdS+1).$ The filtered body trajectory will be preceded or of than the inherent trajectory if Tn>Td.

Figure 15:
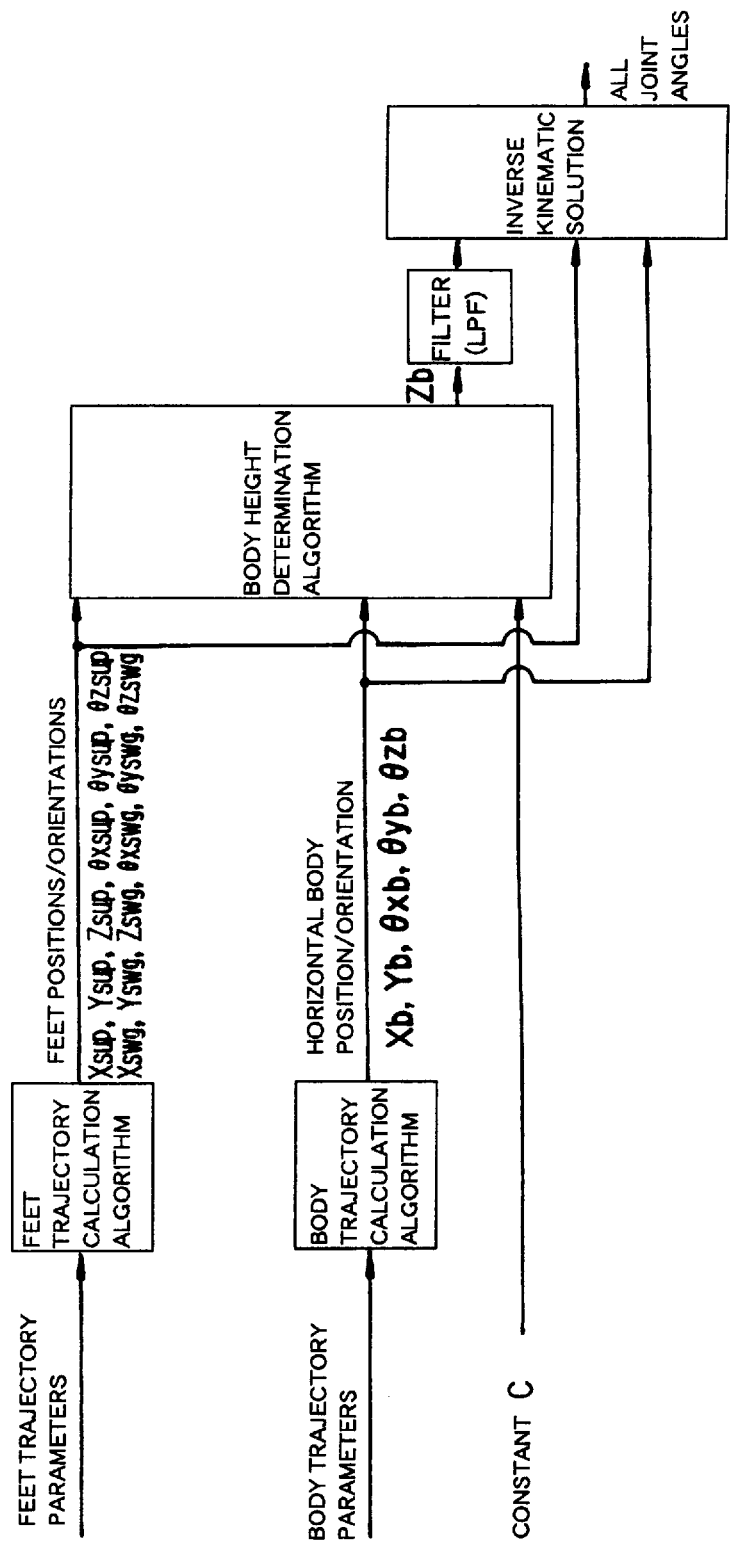
FIG. 15 is a block diagram, similar to FIG. 4, but showing the configuration of the gait generation or determination system according to a fifth embodiment of the invention.

FIG. 15 is a block diagram, similar to FIG. 4, but showing the configuration of the system according to a fifth embodiment of the invention.

In the fifth embodiment, as illustrated in FIG. 15, the desired body height generated in the manner shown in the first embodiment is filtered and is smoothed.

Figure 16:
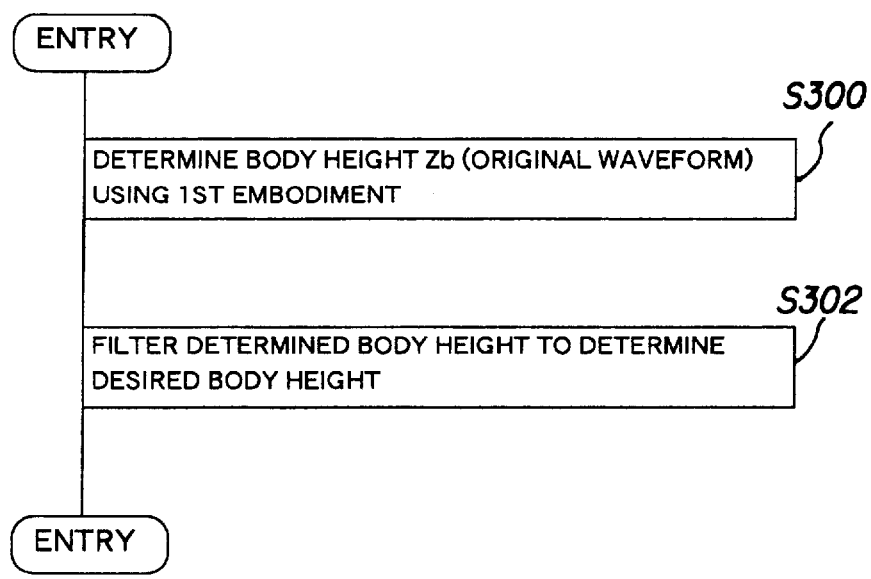
FIG. 16 is a flow chart, similar to FIG. 6, but showing the operation of the system according to the fifth embodiment.

FIG. 16 is a flow chart showing the operation of the system.

Explaining the operation with reference to the figure, the program starts at S300 in which the desired body height Zb is calculated or determined in the manner described in FIG. 6 in the first embodiment. In the routine shown in FIG. 16, the desired body height is determined or calculated at every time interval $\Delta t$ as mentioned earlier. When the values successively calculated are logged or gathered and expressed over one walking period, however, they will be a waveform as was illustrated in FIG. 11. The waveform will be sometimes referred to as "original waveform".

The program then proceeds to S302 in which the calculated body height is passed through a filter having a predetermined cutoff frequency, and the filtered value is determined to be the desired body height. A component in the calculated value (original waveform) whose frequency is higher than the cutoff frequency is eliminated by the filter. As a result, the desired body height in waveform can thus been smoothed.

It should be noted that, although the body height is calculated using the manner described in the first embodiment, it is alternatively possible to calculate it using any manner described in the second to fourth embodiments.

In addition to the advantages mentioned in the foregoing embodiment, with the arrangement, the system according to the fifth embodiment can further decrease the amplitude of the vertical acceleration by filtering.

With the arrangement, on the other hand, the fifth embodiment is disadvantageous in that the amplitudes in the angular velocity and acceleration in the joints becomes greater than those in the foregoing embodiments. Further, the possibility of ensuring the robot posture which satisfies the desired body height is somewhat degraded. For example, when the robot locomotion is controlled to descend stairs, the smoothing by the filter might make it difficult to immediately lower the body height, rendering it difficult for the robot to keep a stable posture.

Figure 17:
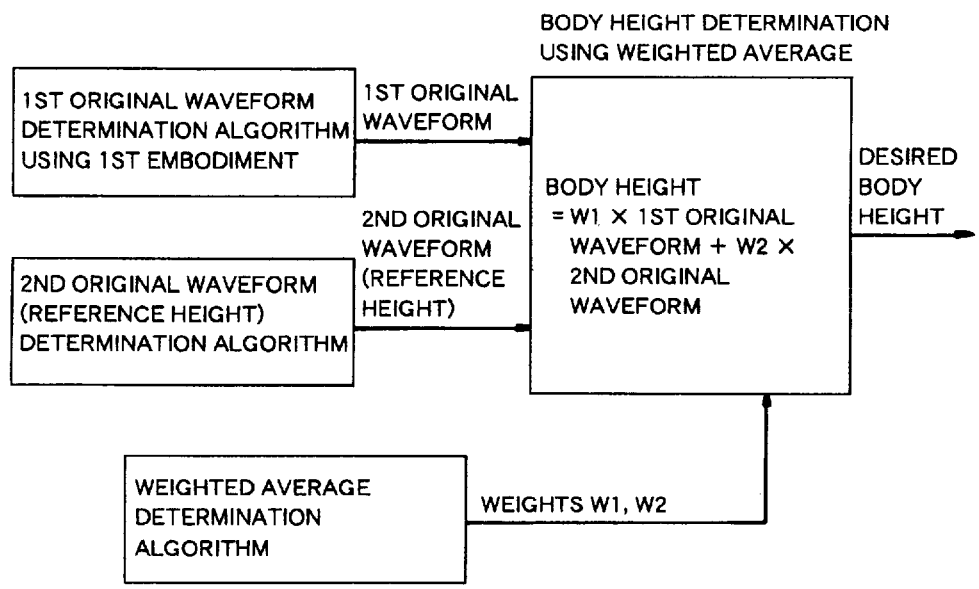
FIG. 17 is a block diagram, similar to FIG. 4, but showing the configuration of the gait generation or determination system according to a sixth embodiment of the invention.

FIG. 17 is a block diagram, similar to FIG. 4, but showing the configuration of the system according to a sixth embodiment of the invention.

In the sixth embodiment, a first body height (referred to as a first original waveform) is calculated in accordance with the method in the first embodiment and a second body height (referred to as a second waveform or reference height) is calculated in accordance with the conventional first method (which aims to keep the body height constant). Then, a weighted average of the first and second body heights is calculated and the weighted average is determined as the desired body height.

Figure 18:
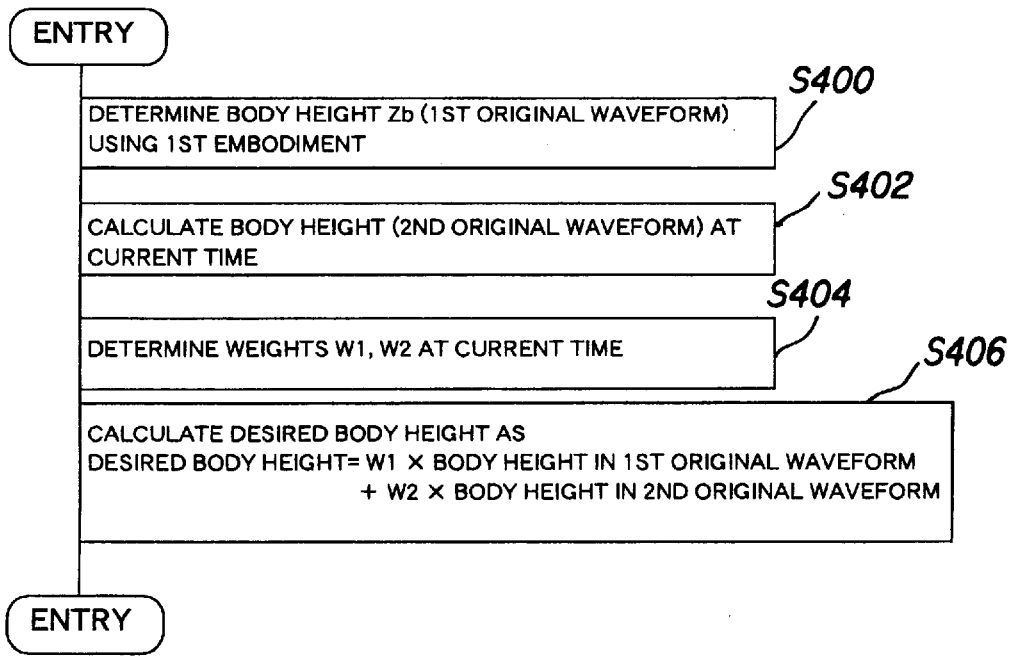
FIG. 18 is a flow chart, similar to FIG. 6, but showing the operation of the system according to the sixth embodiment.

FIG. 18 is a flow chart showing the subroutine of the body height determination in the sixth embodiment. The main routine is not shown, but is the same as that of the first embodiment illustrated in FIG. 5.

The program begins at S400 in which the body height Zb at the current time t (referred to as a first original waveform) is calculated in accordance with the method described in the first embodiment. The program then proceeds to S402 in which, in accordance with the conventional first method using the polynomial of time, another body height at the current time t (referred to as a second original waveform) is calculated or determined. The program then proceeds to S404 in which weights W1, W2 at the current time t are determined, which will be used in a weighted average calculation. The weights should be W1+W2=1.0 and are determined to be smooth with respect to time. The program next proceeds to S406 in which the weight average of the first and second original waveforms is calculated using the weights W1, W2 to determine the desired body height.

In the sixth embodiment, with the arrangement, in addition to the advantages mentioned with reference to the foregoing embodiments, the system is advantageous in that the amplitude of vertical acceleration can be decreased to original accelerations×W1. However, if second original waveform is calculated to be a fixed value ho with respect to the first original waveform and the value ho is determined to be too large (high), the body height obtained becomes so large (height) that the robot posture (determined by a set of joint angles) which satisfies the body height can not always be attained.

It should also be noted that, although two waveforms are used to determine the desired body height, three or more waveforms can instead be used. The averaging is not limited to the weighted averaging, but a simple mean value averaging can instead be used.

It should further be noted that the first original waveform can be obtained by using any method other than that in the first embodiment. And, although the second original waveform is calculated using the conventional first method, it can be calculated using any method in the first to fifth embodiments. Moreover, it will be possible to calculate at least one original waveform using any method described in the first, second, fourth and fifth embodiments, and to calculate a plurality of additional waveforms, and to calculate a weighted average of these to determine the desired body height.

Furthermore, the original waveform can be one of the followings:

a) a fixed value (in the sense of mathematics, a concept included in a polynomial);

b) a time function such as a polynomial (as described in this embodiment);

c) a waveform obtained through successive calculation such as filtering;

d) time-series table data to be read out successively with respect to time;

e) to calculate a first original waveform over 1 walking period on an off-line computer or on an on-board computer in advance through the method of the first embodiment and to store the data in a first table prepared on the on-board computer. The data is then read out from the end (later time) inversely and is successively filtered and stored in a second table. In the gait generation, the data will be read out from the second table from the beginning.

When the original waveform(s) is prepared using e) mentioned above, the method being different from the fifth embodiment, the possibility of ensuring the robot posture which satisfies the desired body height will be enhanced even when the robot locomotion is controlled to walk down stairs, since the desired body height is less (lower) than the original waveform. This will be effective if the vertical acceleration can be decreased, but will be not effective for generating a gait on a real-time basis.

Figure 19:
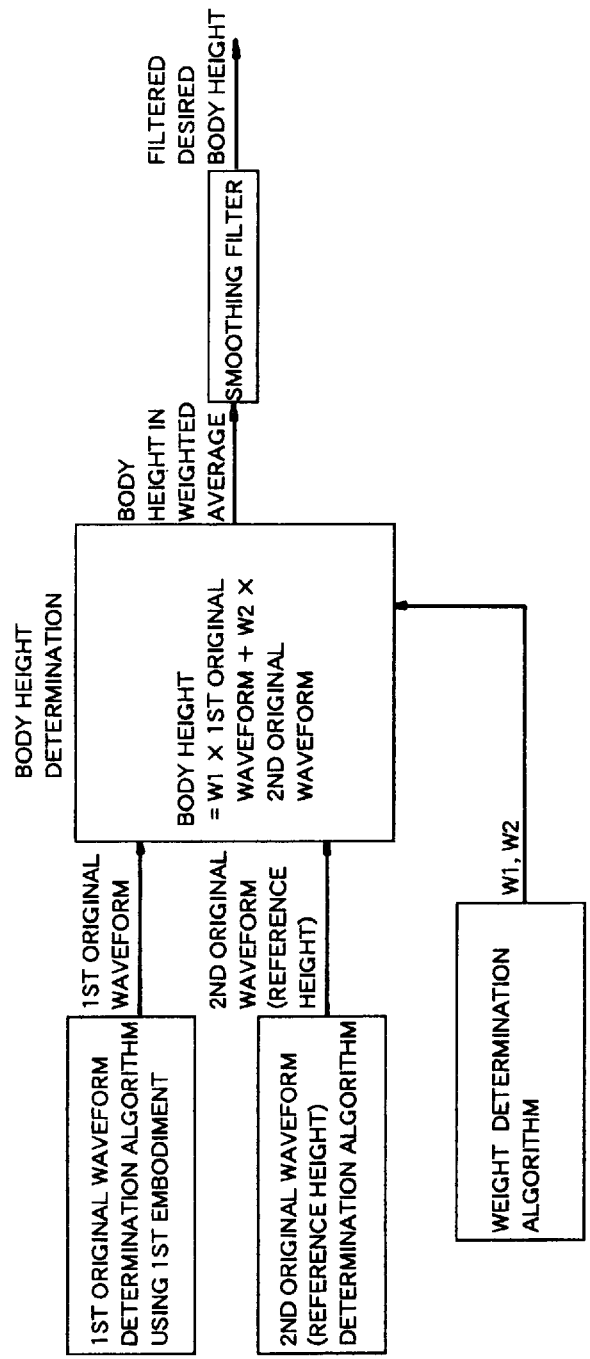
FIG. 19 is a block diagram, similar to FIG. 4, but showing the configuration of the gait generation or determination system according to a seventh embodiment of the invention.

FIG. 19 is a block diagram showing the configuration of the system according to a seventh embodiment of the invention.

In the seventh embodiment, the body height will be determined using the methods in the fifth and sixth embodiments. The obtained value is then smoothed to achieve a more smooth body trajectory.

Figure 20:
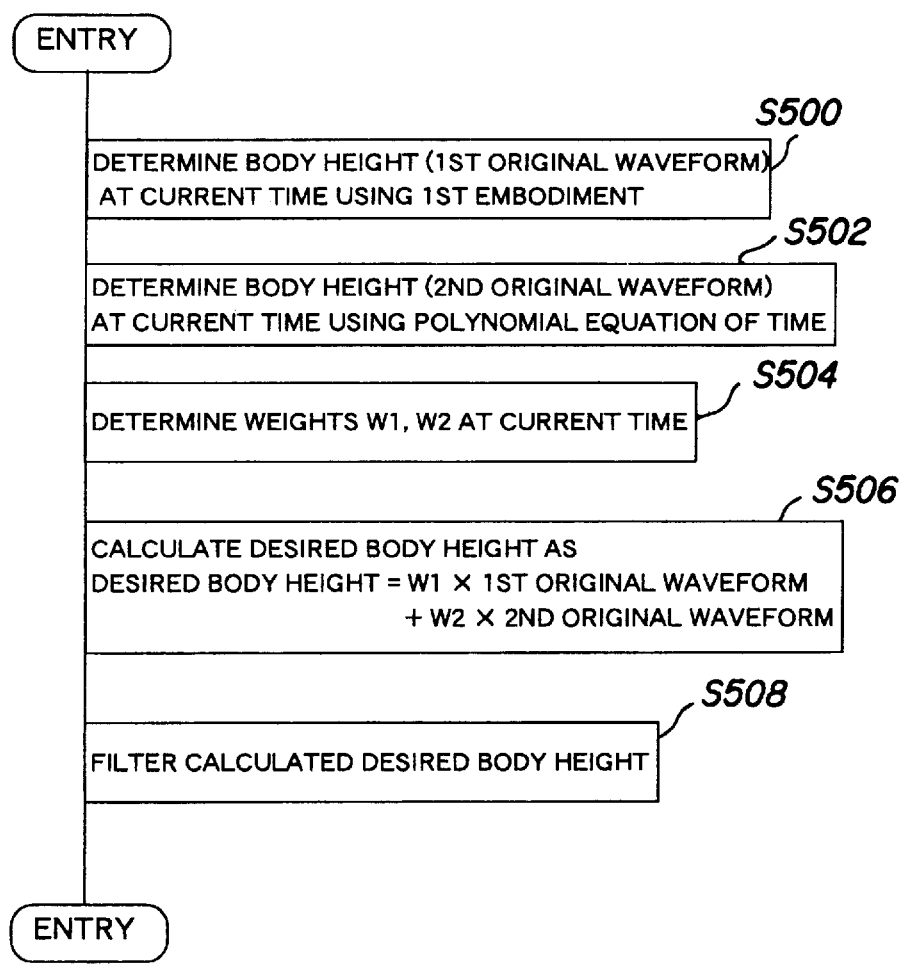
FIG. 20 is a flow chart, similar to FIG. 6, but showing the operation of the system according to the seventh embodiment.

FIG. 20 is a flow chart showing the subroutine for the determination of the desired body height in the seventh embodiment. The main routine is not shown, but is the same as that in the first embodiment.

Explaining the flow chart, the program starts at S500 and proceeds to S506 in which procedures similar to those in the sixth embodiment are made to determine the desired body height. The program then proceeds to S508 in which the determined desired body height is subject to filtering similar to the fifth embodiment.

Since the seventh embodiment is configured in the foregoing, in addition to the advantages mentioned in the foregoing embodiment, the system can determine a more smooth body trajectory.

Figure 21:
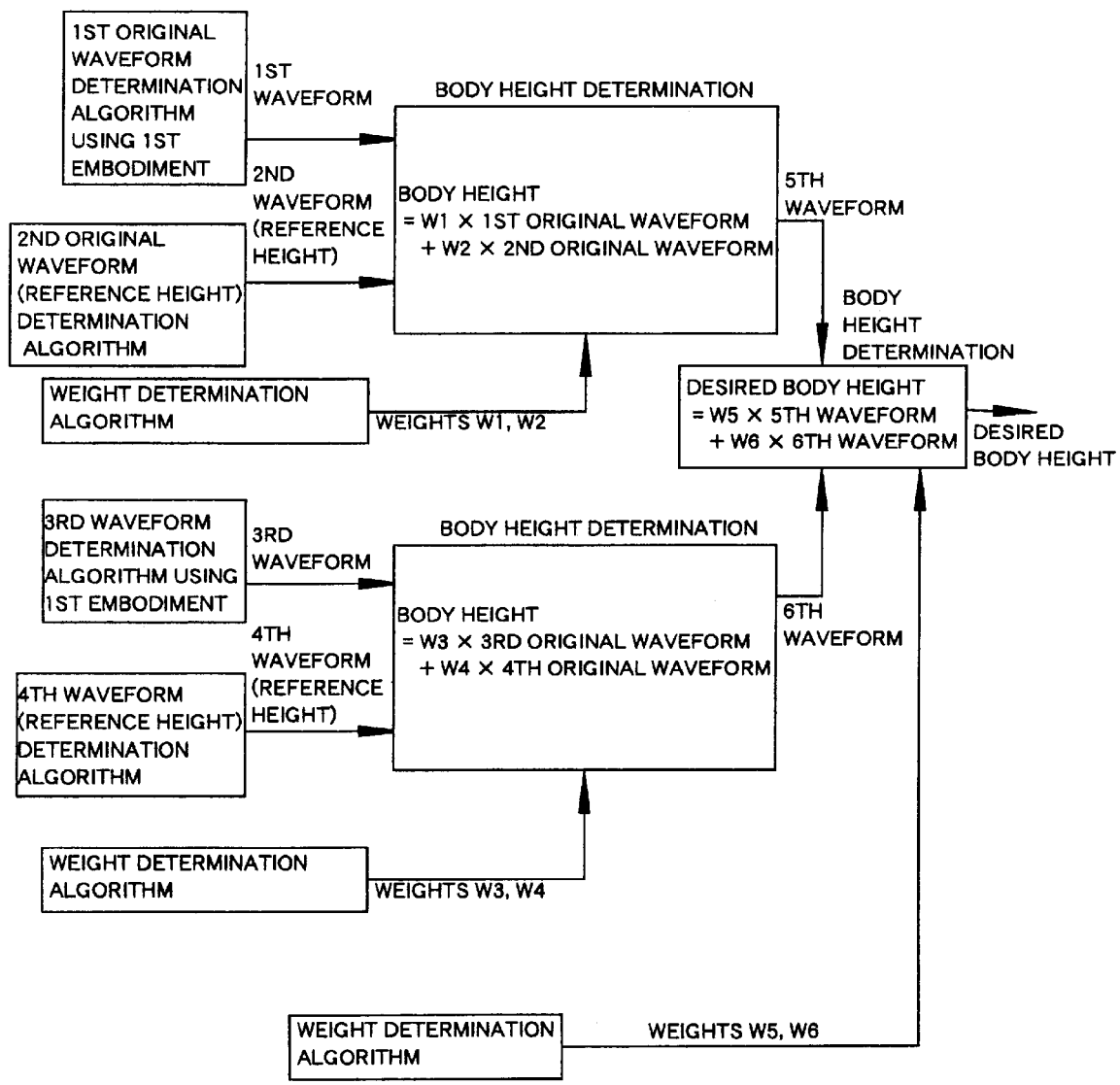
FIG. 21 is a block diagram, similar to FIG. 4, but showing the configuration of the gait generation or determination system according to an eighth embodiment of the invention.

FIG. 21 is a block diagram showing the configuration of the system according to an eighth embodiment of the invention.

In the eighth embodiment, the configuration of the seventh embodiment is prepared in parallel. To be more specific, the first and second original waveforms are weight-averaged in parallel to determine a first waveform, a second waveform, a third waveform and a fourth waveform, using weights W1, W2, W3 and W4. Based on the first and second waveforms, a fifth waveform is generated, while based on the third and fourth waveform, a sixth waveform is generated. The fifth and sixth waveforms are then weight-averaged using weights W5, W6 and the obtained average is determined to be the desired body height. The weights W1, W3, W5 and the weights W2, W4, W6 may all be different from each other, some may be different from each other, or they all may be equal to each other.

Since the eighth embodiment is configured in the foregoing, in addition to the advantages mentioned in the foregoing embodiments, the system can determine a more smooth body trajectory, although the configuration is more complicated than the foregoing embodiments.

The eighth embodiment may be configured to have a further smoothing or weight averaging. However, it will increase the volume of calculation and will not be as effective as expected. The reason is that, although the configuration will decrease the vertical acceleration, it will increase, contrary to what is desired, joint velocity and joint angular velocity.

Figure 22:
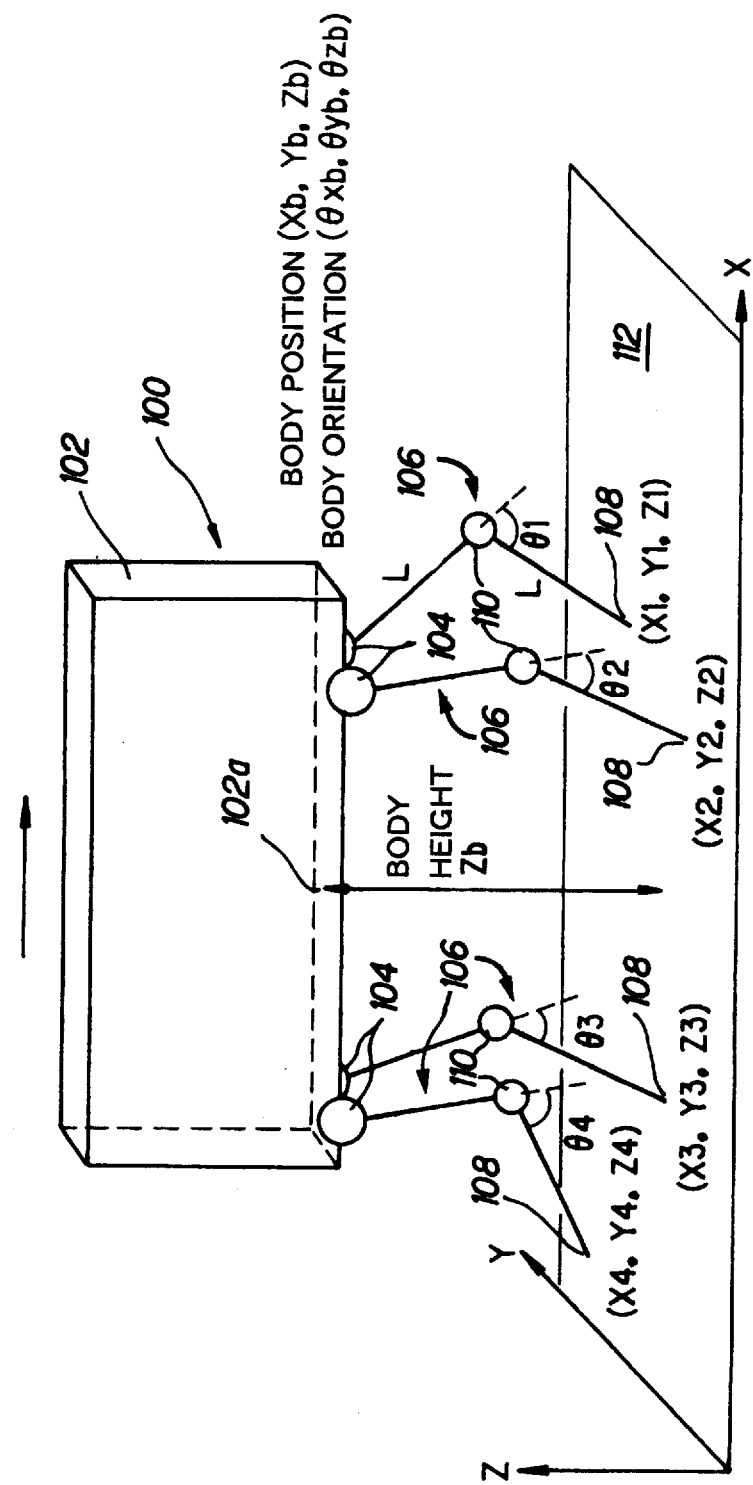
FIG. 22 is a schematic view, similar to FIG. 1, but showing the configuration of the gait generation or determination system according to a ninth embodiment of the invention.

FIG. 22 is a view explaining the configuration of the system according to a ninth embodiment of the invention.

As illustrated in FIG. 22, the ninth embodiment is directed to a gait generation system for a four-legged mobile robot 100. The robot 10 has a body 102 and four legs (leg linkages) 106 each connected to the body 102 by a root joint 104. Each of the legs (leg linkages) 106 has a distal end 108 and an knee joint 110. Although not shown, the joints are provided with actuators to drive the same.

In the ninth embodiment, the system is configured to predetermine a desired horizontal body position (Xb, Yb) and orientation ($\theta$xb, $\theta$yb, $\theta$zb), and a desired leg distal end position (Xn, Yn, Zn) to determine a desired body height Zb based on the predetermined positions and orientations. The robot joint angles are then determined and the locomotion is controlled to move it in the direction indicated by the arrow in the figure. The desired body height Zb is defined by a distance in the direction of gravity between a bottom center 102a of the body 102 and a floor 112. Here, as disclosed in FIG. 23, the angle of each knee joint 110 is defined as $\theta$n (n: 1 to 4).

Figure 24:
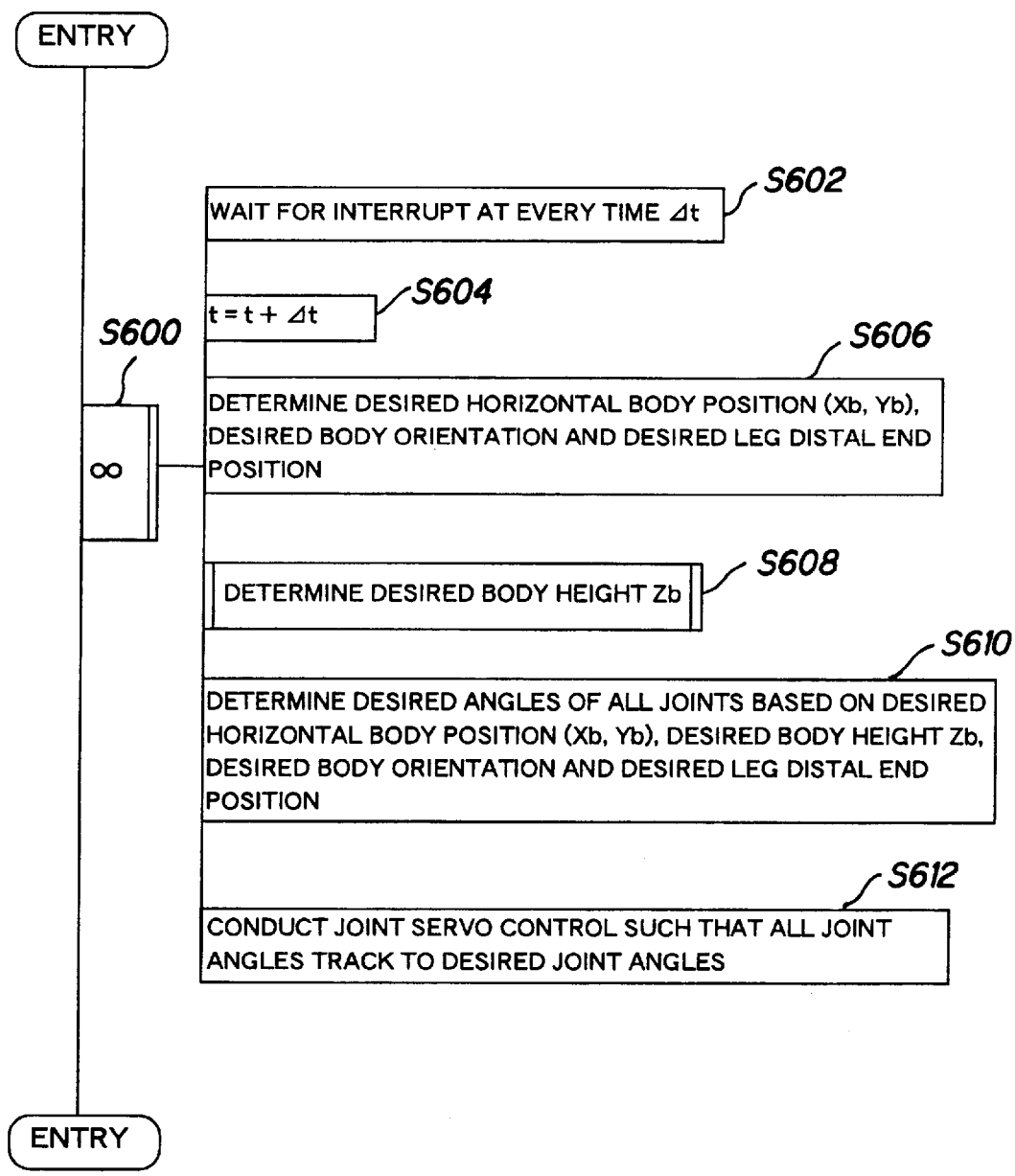
FIG. 24 is a main routine flow chart showing the operation of the gait generation or determination system according to the ninth embodiment.

FIG. 24 is a flow chart showing the main routine for the gait generation.

Explaining the flow chart, the program starts at S600 and proceeds to S604 in which procedures similar to those in the first embodiment are conducted. The program then proceeds to S606 in which the desired horizontal body position (Xb, Yb) and orientation ($\theta$xb, $\theta$yb, $\theta$zb), and the desired leg distal end position (Xn, Yn, Zn) at the current time t are determined, and proceeds to S608 in which the desired body height Zb is determined.

Figure 25:
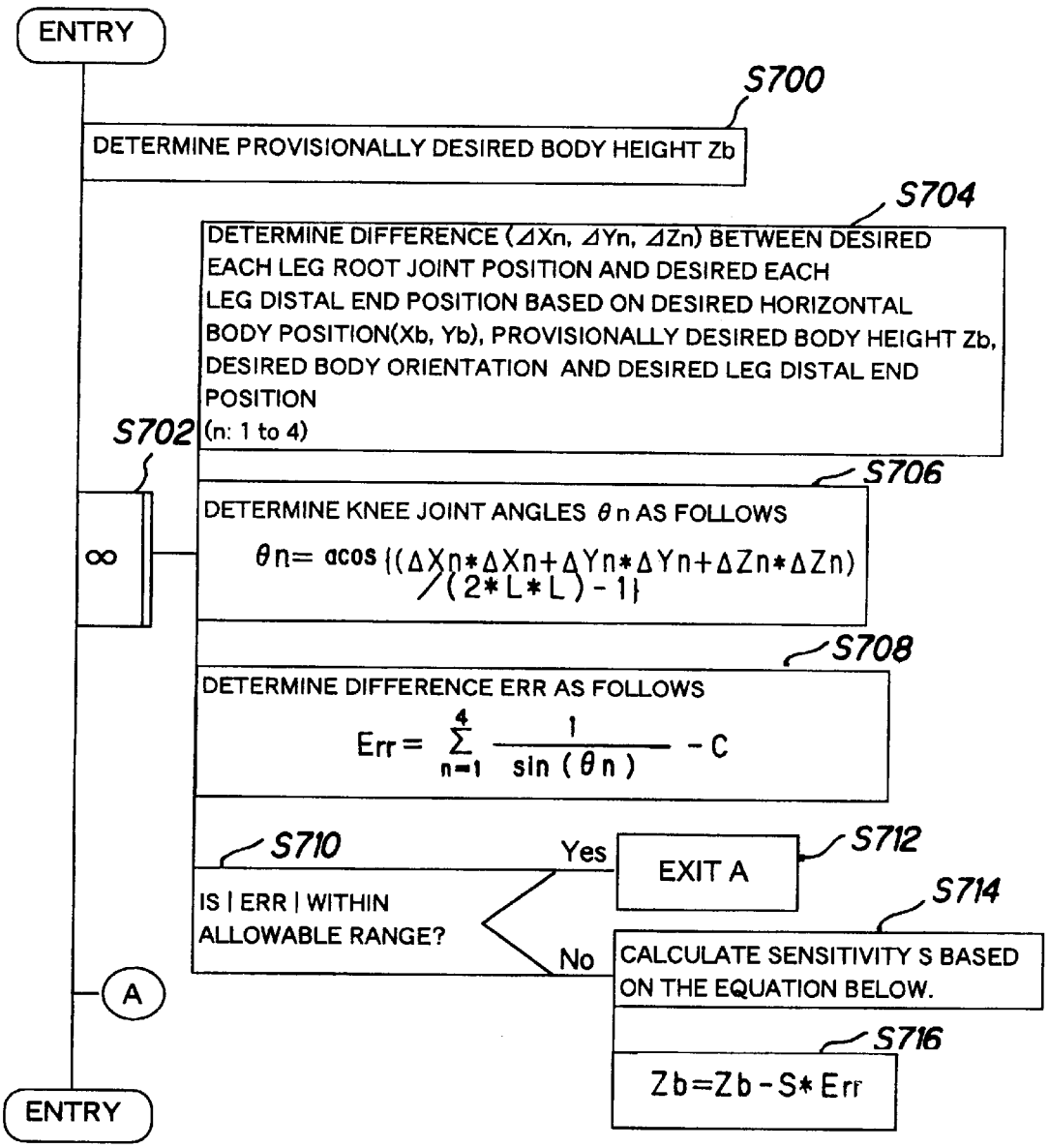
FIG. 25 is a flow chart showing the subroutine of the determination of a body height referred to in the flow chart of FIG. 24.

FIG. 25 is a flow chart showing the subroutine for the determination of the desired body height.

Figure 23:
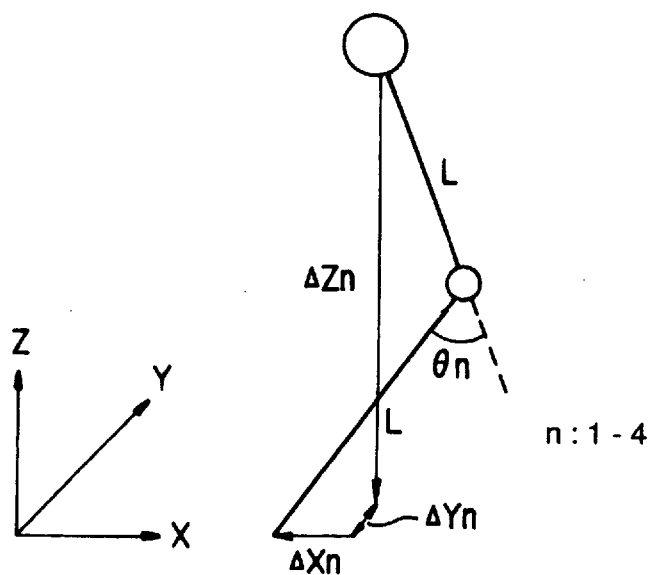
FIG. 23 is a view, similar to FIG. 7, but showing parameters used in the system according to the ninth embodiment.

The program starts at S700 in which the body height is provisionally determined and proceeds, via S702, to S704 in which a difference (ΔXn, ΔYn, ΔZn) between the root joint positions of the legs and the desired leg distal end positions (Xn, Yn, Zn) are calculated, based on the desired horizontal body position (Xb, Yb) and orientation (θxb, θyb, θzb), the provisionally determined body height Zb and the desired leg distal end position (Xn, Yn, Zn). FIG. 23 illustrates these parameters.

The program then proceeds to S706 in which the knee joint angles θn (n: 1 to 4) are determined in accordance with an equation illustrated there. The program then proceeds to S708 in which a difference ERR is calculated in accordance with the equation there, and proceeds to S710 in which it is determined whether the absolute value of the difference is within an allowable range. If the result is affirmative, the program proceeds to S712 and is terminated immediately. If the result is negative, the program proceeds to S714 in which the sensitivity S is calculated using an equation of sensitivity mentioned below in the figure and proceeds to S716 in which the provisionally determined body height Zb is corrected in the manner as illustrated.

With the arrangement, the system in the ninth embodiment can generate or determine a gait, or more specifically, determine the body height of the four-legged robot appropriately. It will be apparent from the description from the ninth embodiment that the gait generation or determination system according to the invention is able to determine the desired body height in the same manner as mentioned in the foregoing embodiments. It will also be apparent from the description of the ninth embodiment that the gait generation or determination system according to the invention is able to determine the body height for a robot having three legs or more than four legs. If the robot is one which climbs a wall, the body height will be a distance between the robot body and the wall.

In the first to ninth embodiments, there is thus provided a system for generating a gait of a legged mobile robot (1, 100) having at least a body (24, 102) and a plurality of articulated legs (2, 106) each connected to the body through a first joint (10, 12, 14R(L), 104) and each including a second joint (16, 18, 20R(L), 110) at a location toward its distal end (22, 108), comprising: body trajectory determining means (body trajectory calculation algorithm) for determining a trajectory of body displacement including at least one of desired horizontal body position and orientation, but excluding a desired body height in a direction of gravity; leg trajectory determining means (feet trajectory calculation algorithm) for determining a trajectory of each leg distal end displacement including at least one of desired position and orientation; desired body height determining means (body height determination algorithm) for determining a body height in the direction of gravity by solving an equation comprised of a continuous function of the body height based on the determined body trajectory and leg trajectory to determine the desired body height based on the solution; and joint angle determining means (inverse kinematic solution) for determining desired angles of said first and second joints based on said determined body trajectory, said leg trajectory and said determined desired body height. The body trajectory is sufficient if it includes at least one of desired horizontal body position and orientation, but excluding a desired body height in a direction of gravity. Similarly, the leg trajectory is sufficient if it includes at least one of desired position and orientation.

In the above, said equation is an equation comprised of a continuous function of the displacement of at least one of said first and second joints, said equation is a symmetric expression established with respect to at least one of said first and second joints. The solution of the continuous function varies monotonically with increasing body height in the direction of gravity. At least one of said desired horizontal body position, said desired horizontal body orientation, said desired each leg distal end position and said desired each leg desired distal end orientation is a virtual value.

In the above, said desired body height determining means including; body height calculating means (body height determination algorithm 1, 2, 3) for calculating n (n≧1) number of body heights in the direction of gravity; average calculating means (average calculation) for calculating an average between said solution and said n number of calculated body heights; and said desired body height determining means determines the desired body height based on the average, wherein said average is a weighted average. In the above, smoothing means is included for smoothing at least one of said solution and said average. Said desired body height determining means determines said solution using at least one of a Newton calculation method. The system further includes joint servo controller for controlling actuators of said first and second joints in response to the desired angles.

Similarly, there is disclosed a method for generating a gait of a legged mobile robot (1, 100) having at least a body (24, 102) and a plurality of articulated legs (2, 106) each connected to the body through a first joint (10, 12, 14R(L), 104) and each including a second joint (16, 18, 20R(L), 110) at a location toward its distal end (22, 108), comprising: determining a trajectory of body displacement including at least one of desired horizontal body position and orientation, but excluding a desired body height in a direction of gravity; determining a trajectory of each leg distal end displacement including at least one of desired position and orientation; determining a body height in the direction of gravity by solving an equation comprised of a continuous function describing the body height based on the determined body trajectory and leg trajectory to determine the desired body height based on the solution; and determining desired angles of said first and second joint based on said determined body trajectory, said leg trajectory and said determined desired body height.

In the first to ninth embodiments, although the body height is generated or determined in the direction of gravity, the body height is not necessarily to be determined in that direction, but may be determined in any direction other than the direction of gravity.

In the first to ninth embodiment, although Eq. 1 is used as example of the monotonic continuous function $f(\theta sup, \theta swg)$, it is alternatively possible to use an equation other than that in Eq. 1. The equation should preferably be determined such that the solution of $f(\theta sup, \theta swg)$ becomes quite large as θsup or θswg is close to zero (or very small value). Since $f=C$ can be rewritten as $1/f=1/C$ or $-f=-C$, if $1/f$ or $-f$ is replaced, as a new continuous function, with the monotonic continuous function $ff$, the function will be a monotonic decreasing function. Thus, the function may be a monotonic decreasing function.

In the first embodiment, although the continuous function $f$ is defined with respect to the knee joint, the function may be defined for another joint or for all the joints including the knee joint. In such a case, all the desired joint angles can be determined based on the body position/orientation and leg distal end (feet) positions/orientations, through the inverse kinematic solution. And, since the function of joint angle $f$ can be converted into the function of body height g, the desired body height can be determined in a manner similar to that in the first embodiment.

The continuous function $f$ may include not only the term defining joint displacement, but also a term defining a joint (displacement) velocity.

If a robot has a leg including more than six joints, the joint angles can not be determined uniquely or solely from the body position/orientation and leg distal end positions/orientations. However, if an equation defining a restraint condition of the joint angles exists, the joint angles can be solely determined from the parameters, enabling to determine the body height in a manner similar to that in the first embodiment.

In the first embodiment, although C is a constant, it may be a value which varies with respect to time. This is because there is a solution indicative of body height which satisfies the equation from characteristic 2 of the basic principle, if C is larger than a predetermined value. If C is determined to be variable, however, C should preferably be varied smoothly so as to make the robot motion smooth. The parameters of the functions $f$ or $g$ may also be varied with respect to time.

When the structure of the robot is symmetrical in the left and right halves, as is disclosed in FIG. 1, it is possible to use a symmetric expression of the left and right joints as the functions $f$ describing the joint angle, it will be possible to effect the control in which the locomotion is symmetric in the left and right.

The weights W used in the foregoing embodiments can be varied with respect to time always keeping the sum of the weights 1.0. If variation is not smooth, vertical body acceleration will be excessive. The aforesaid filter proposed by the assignee and described in U.S. Pat. No. 5,428,563 can be used for that purpose.

As mentioned earlier, if a weighted average of a plurality of body heights is calculated to determine a desired body height, it becomes possible to decrease the amplitude of vertical body acceleration. However, this would cause the amplitudes in joint velocity and joint acceleration to increase. On the other hand, this will sometimes degrade the possibility of ensuring a robot posture to obtain the desired body height.

In the foregoing embodiments, it is possible to employ a detecting means for detecting the condition of locomotion or environment so as to switch the gait generation from one to another or to vary the weights in response to the detected result.

Although the invention has thus been shown and described with reference to specific embodiments, it should be noted that the invention is in no way limited to the details of the described arrangement, but changes and modifications may be made without departing from the scope of the invention, which is defined by the appended claims.

What is claimed is:

1. A system for generating a gait of a legged mobile robot having at least a body and a plurality of articulated legs each connected to the body through a first joint and each including a second joint, comprising:
    body trajectory determining means for determining a trajectory of body displacement including at least one of desired horizontal body position and orientation, but excluding a desired body height;
    leg trajectory determining means for determining a trajectory of each leg distal end displacement including at least one of desired position and orientation;
    desired body height determining means for determining a body height by solving an equation comprised of a continuous function of the body height based on the determined body trajectory and leg trajectory to determine the desired body height based on the solution; and
    joint angle determining means for determining desired angles of said first and second joints based on said determined body trajectory, said leg trajectory and said determined desired body height.

2. A system according to claim 1, wherein said equation is an equation comprised of a continuous function of the displacement of at least one of said first and second joints.

3. A system according to claim 2, wherein said equation is a symmetric expression established with respect to at least one of said first and second joints.

4. A system according to claim 2, wherein the solution of the continuous function varies monotonically with increasing body height.

5. A system according to claim 3, wherein the solution of the continuous function varies monotonically with increasing body height.

6. A system according to claim 1, wherein at least one of said desired horizontal body position, said desired horizontal body orientation, said desired each leg distal end position and said desired each leg desired distal end orientation is a virtual value.

7. A system according to claim 2, wherein at least one of said desired horizontal body position, said desired horizontal body orientation, said desired each leg distal end position and said desired each leg desired distal end orientation is a virtual value.

8. A system according to claim 1, wherein said desired body height determining means includes:
    body height calculating means for calculating n (n≧1) number of body heights; and
    average calculating means for calculating an average between said solution and said n number of calculated body heights; and
    wherein said desired body height determining means determines the desired body height based on the average.

9. A system according to claim 2, wherein said desired body height determining means includes:
    body height calculating means for calculating n (n≧1) number of body heights; and
    average calculating means for calculating an average of said solution and said n number of calculated body heights, and
    wherein said desired body height determining means determines the desired body height based on the average.

10. A system according to claim 8, wherein said average is a weighted average.

11. A system according to claim 9, wherein said average is a weighted average.

12. A system according to claim 8, said desired body height determining means further including:
    smoothing means for smoothing at least one of said solution and said average.

13. A system according to claim 9, said desired body height determining means further including:
    smoothing means for smoothing at least one of said solution and said average.

14. A system according to claim 1, wherein said desired body height determining means determines said solution using a Newton calculation method.

15. A system according to claim 1, further including:
    joint servo controller for controlling actuators of said first and second joints in response to the desired angles.

16. A system according to claim 1, wherein said legged mobile robot is a biped robot, said first joint is a hip joint and said second joint is a knee joint.

17. A system according to claim 1, wherein said legged mobile robot is a robot having legs more than two, said first joint is a root joint and said second joint is a knee joint.

18. A system for generating a desired height of a biped mobile robot having a body and two articulated legs each connected to the body through a hip joint and each including a knee joint, an ankle joint and a foot, comprising:

body trajectory determining means for determining a trajectory of body displacement including at least one of desired horizontal body position and orientation, but excluding a desired body height;

leg trajectory determining means for determining a trajectory of foot displacement including at least one of desired position and orientation;

desired body height determining means for determining a body height by solving an equation comprised of a continuous function of the body height based on the determined body trajectory and leg trajectory to determine the desired body height based on the solution; and joint angle determining means for determining desired angles of said hip joints, said knee joint and said ankle joint based on said determined body trajectory, said leg trajectory and said determined desired body height.

19. A method for generating a gait of a legged mobile robot having at least a body and a plurality of articulated legs each connected to the body through a first joint and each including a second joint, comprising the steps of:

determining a trajectory of body displacement including at least one of desired horizontal body position and orientation, but excluding a desired body height;

determining a trajectory of each leg distal end displacement including at least one of desired position and orientation;

determining a body height in the direction of gravity by solving an equation comprised of a continuous function of the body height based on the determined body trajectory and leg trajectory to determine the desired body height based on the solution; and determining desired angles of said first and second joints based on said determined body trajectory, said leg trajectory and said determined desired body height.

20. A method according to claim 19, wherein said equation is an equation comprised of a continuous function of the displacement of at least one of said first and second joints.

21. A method according to claim 20, wherein said equation is a symmetric expression established with respect to at least one of said first and second joints.

22. A method according to claim 20, wherein the solution of the continuous function varies monotonically with increasing body height.

23. A method according to claim 21, wherein the solution of the continuous function varies monotonically with increasing body height.

24. A method according to claim 19, wherein at least one of said desired horizontal body position, said desired horizontal body orientation, said desired each leg distal end position and said desired each leg desired distal end orientation is a virtual value.

25. A method according to claim 20, wherein at least one of said desired horizontal body position, said desired horizontal body orientation, said desired each leg distal end position and said desired each leg desired distal end orientation is a virtual value.

26. A method according to claim 19, further comprising the steps of:

calculating n (n≧1) number of body heights;

calculating an average of said solution and said n number of calculated body heights; and determining the desired body height based on the average.

27. A method according to claim 19, further comprising the steps of:

calculating n (n≧1) number of body heights;

calculating an average of said solution and said n number of calculated body heights; and determining the desired body height based on the average.

28. A method according to claim 26, wherein said average is a weighted average.

29. A method according to claim 27, wherein said average is a weighted average.

30. A method according to claim 26, further comprising the steps of:

smoothing at least one of said solution and said average.

31. A method according to claim 27, further comprising the steps of:

smoothing at least one of said solution and said average.

32. A method according to claim 19, further comprising the step of:

determining said solution using a Newton calculation method.

33. A method according to claim 19, further comprising the step:

controlling actuators of said first and second joints in response to the desired angles.

34. A method according to claim 19, wherein said legged mobile robot is a biped robot, said first joint is a hip joint and said second joint is a knee joint.

35. A method according to claim 19, wherein said legged mobile robot is a robot having legs more than two, said first joint is a root joint and said second joint is a knee joint.

36. A computer program, embodied on a computer-readable memory, for generating a gait of a legged mobile robot having at least a body and a plurality of articulated legs each connected to the body through a first joint and each including a second joint at a location toward its distal end, said computer program comprising the steps of:

determining a trajectory of body displacement including at least one of desired horizontal body position and orientation, but excluding a desired body height;

determining a trajectory of each leg distal end displacement including at least one of desired position and orientation;

determining a body height by solving an equation comprised of a continuous function of the body height based on the determined body trajectory and leg trajectory to determine the desired body height based on the solution; and determining desired angles of said first and second joints based on said determined body trajectory, said leg trajectory and said determined desired body height.

* * * * *